United States Patent
Hoang et al.

(10) Patent No.: US 12,452,764 B2
(45) Date of Patent: Oct. 21, 2025

(54) METHODS, ARCHITECTURES, APPARATUSES AND SYSTEMS DIRECTED TO RELAY AND PATH SELECTION AND RESELECTION

(71) Applicant: InterDigital Patent Holdings, Inc., Wilmington, DE (US)

(72) Inventors: Tuong Hoang, Montreal (CA); Martino Freda, Laval (CA); Tao Deng, Roslyn, NY (US); Jaya Rao, Montreal (CA); Moon Il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/007,845

(22) PCT Filed: Jun. 4, 2021

(86) PCT No.: PCT/US2021/036045
§ 371 (c)(1),
(2) Date: Dec. 2, 2022

(87) PCT Pub. No.: WO2021/248096
PCT Pub. Date: Dec. 9, 2021

(65) Prior Publication Data
US 2023/0300713 A1    Sep. 21, 2023

Related U.S. Application Data

(60) Provisional application No. 63/034,980, filed on Jun. 4, 2020, provisional application No. 63/091,883, filed
(Continued)

(51) Int. Cl.
*H04W 40/24*    (2009.01)
*H04W 40/12*    (2009.01)

(52) U.S. Cl.
CPC ......... *H04W 40/24* (2013.01); *H04W 40/12* (2013.01)

(58) Field of Classification Search
None
See application file for complete search history.

(56) References Cited

U.S. PATENT DOCUMENTS 10,531,365 B2 * 1/2020 Kaur .................. H04W 48/10
10,813,068 B2    10/2020 He et al.
(Continued)

FOREIGN PATENT DOCUMENTS

KR    20180080272 A    7/2018
WO   WO 2016073984 A2    5/2016

OTHER PUBLICATIONS

Third Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 3GPP TS 36.300 V15.4.0 (Dec. 2018), 363 pages.
(Continued)

*Primary Examiner* — Xavier S Wong
(74) *Attorney, Agent, or Firm* — Majid Albassam

(57) ABSTRACT

Procedures, methods, architectures, apparatuses, systems, devices, and computer program products directed to selection and/or reselection of WTRUs and paths are provided. Among such methods is a method that may be implemented in a first WTRU and may include determining first measurements based on first sidelink transmissions received from a second WTRU; receiving, from the second WTRU, second measurements associated with a path between the first WTRU and a third WTRU, wherein second measurements are based, at least in part, on sidelink transmissions exchanged between the third WTRU and the second WTRU or between the third WTRU and a fourth WTRU; determin-
(Continued)

ing a measurement of the path based on any of the first and second measurements; determining transmission parameters for transmitting discovery messages during a communication period based on any of the measurement of the path and quality of service criteria; and transmitting the discovery messages according to the transmission parameters.

16 Claims, 10 Drawing Sheets

Related U.S. Application Data on Oct. 14, 2020, provisional application No. 63/136,550, filed on Jan. 12, 2021.

(56) References Cited

U.S. PATENT DOCUMENTS

| | | | |
|---|---|---|---|
| 2017/0359766 A1 | 12/2017 | Agiwal et al. | |
| 2018/0063768 A1* | 3/2018 | Martin | H04W 36/302 |
| 2018/0092017 A1 | 3/2018 | Freda et al. | |
| 2018/0098249 A1* | 4/2018 | Lee | H04W 76/23 |
| 2018/0109990 A1 | 4/2018 | Martin et al. | |
| 2018/0123682 A1 | 5/2018 | Jung et al. | |
| 2018/0242190 A1* | 8/2018 | Khoryaev | H04W 4/40 |
| 2018/0343598 A1 | 11/2018 | Xu et al. | |
| 2019/0028947 A1 | 1/2019 | Adachi | |
| 2020/0322839 A1 | 10/2020 | Nguyen et al. | |
| 2021/0083832 A1 | 3/2021 | Zhou et al. | |
| 2022/0053385 A1 | 2/2022 | Li et al. | |
| 2023/0005335 A1 | 1/2023 | Fiumara | |
| 2023/0053351 A1 | 2/2023 | Cheng et al. | |
| 2023/0136428 A1 | 5/2023 | Cheng et al. | |
| 2023/0300713 A1 | 9/2023 | Hoang et al. | |

OTHER PUBLICATIONS

Third Generation Partnership Project; Technical Specification Group Radio Access Network; Study on further enhancements to LTE Device to Device (D2D), User Equipment (UE) to network relays for Internet of Things (IoT) and wearables; (Release 15); 3GPP TR 36.746 V15.1.1 (Apr. 2018), 55 pages.

Third Generation Partnership Project; Technical Specification Group Radio Access Network; NR; NR and NG-RAN Overall Description; Stage 2 (Release 16); 3GPP TS 38.300 V16.1.0, Mar. 2020; 133 pages.

C. Chang et al., "Relay discovery and selection for large-scale P2P streaming", On Line, PLOS One—https://doi.org/10.1371/journal.pone.0175360 Apr. 14, 2017, 29 pages.

New SID: "Study on NR sidelink relay", 3GPP Tdoc RP-193253, 3GPP TSG RAN Meeting #86 (revision of RP-193118); Sitges, Spain, Dec. 9-12, 2019, 5 pages.

Reman et al., "An adaptive relay nodes selection scheme for multi-hop broadcast in VANETs", Computer Communiczations, Elsevier Science Publishers BV, Amsterdam, NL, vol. 87, Apr. 23, 2016, 15 pages.

3rd Generation Partnership Project; Technical Specification Group Services and System Aspects; Architecture enhancements for 5G System (5GS) to support Vehicle-to-Everything (V2X) services (Release 16); 3GPP TS 23.287 V16.2.0 (Mar. 2020), 53 pages.

* cited by examiner

Example Communications System Architecture Supporting Sidelink Relays

METHODS, ARCHITECTURES, APPARATUSES AND SYSTEMS DIRECTED TO RELAY AND PATH SELECTION AND RESELECTION

CROSS REFERENCE TO RELATED APPLICATIONS

This application is a U.S. National Stage Application under 35 U.S.C. § 371 of International Patent Application No. PCT/US2021/036045, filed Jun. 4, 2021, which claims the benefit of U.S. Provisional Patent Application Nos. (i) 63/034,980 filed Jun. 4, 2020, Jun. 4, 2020; (ii) 63/091,883 filed Oct. 14, 2020; and (iii) 63/136,550 filed Jan. 12, 2021; each of which is incorporated herein by reference.

BACKGROUND

This application is related to wired and/or wireless communications, including, for example, carrying out any of relay selection and/or reselection, path selection and/or reselection, and procedures in connection with relay selection and/or reselection and path selection and/or reselection.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
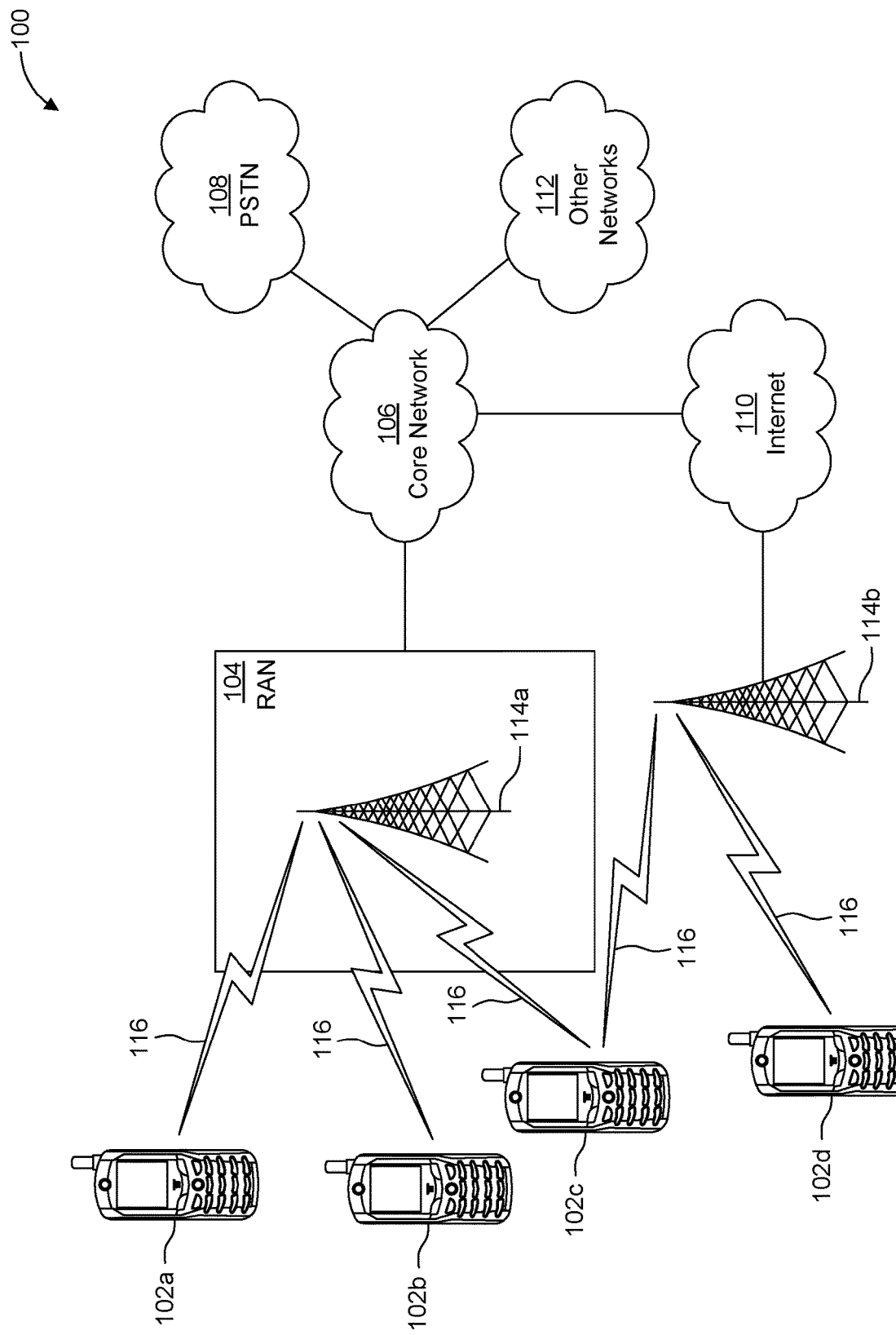
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
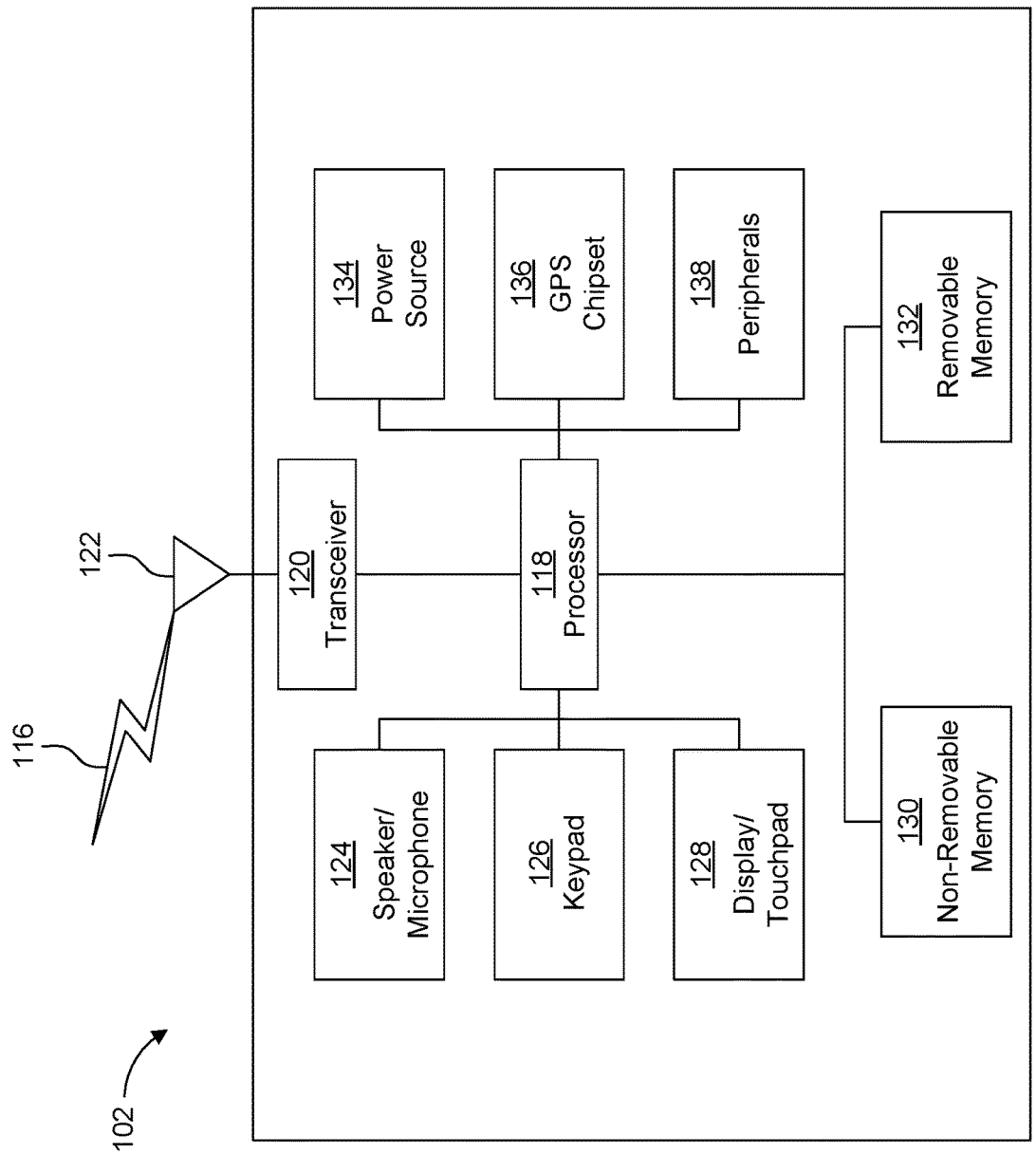
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
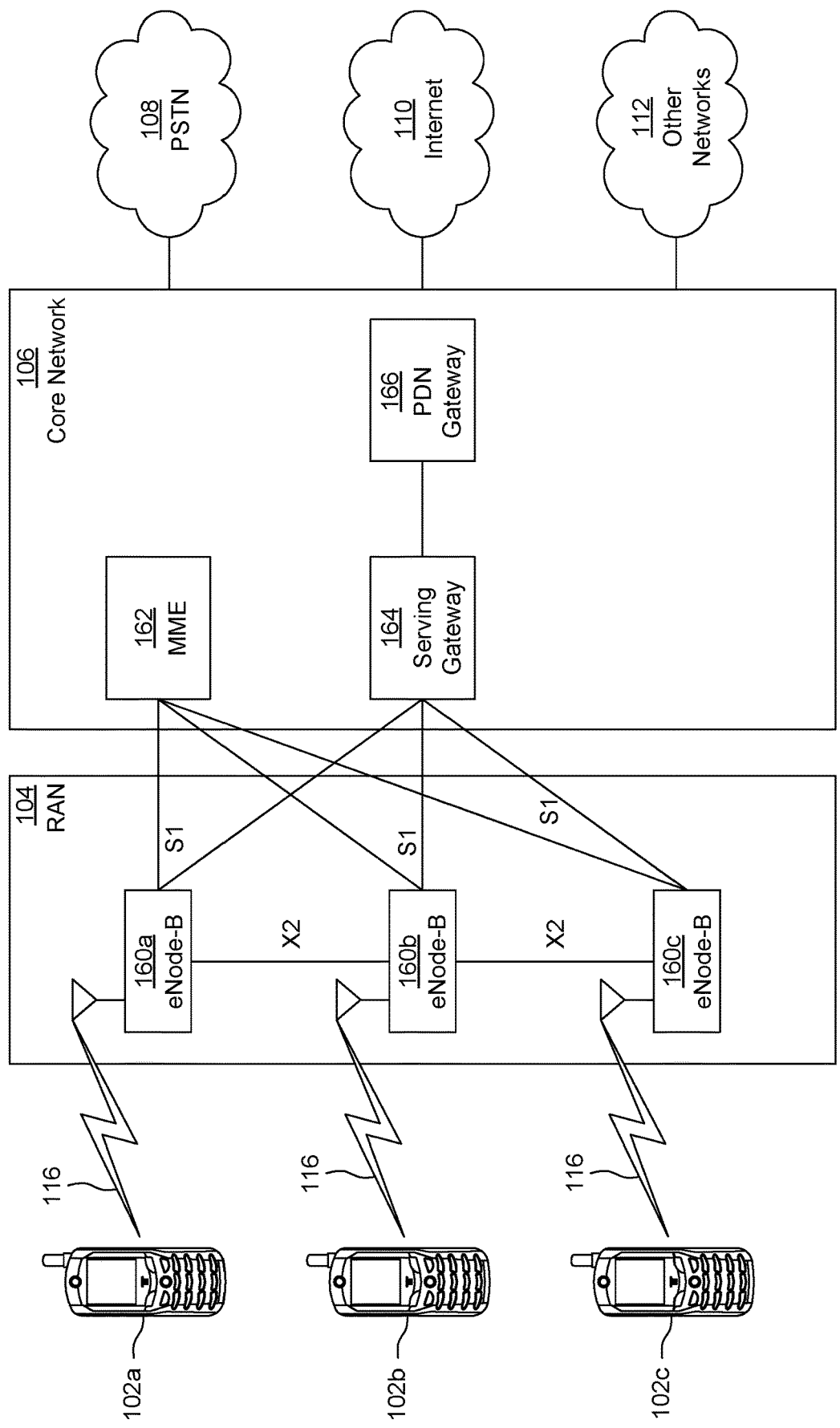
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode-B handovers, triggering paging and/or mobile termination when DL data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
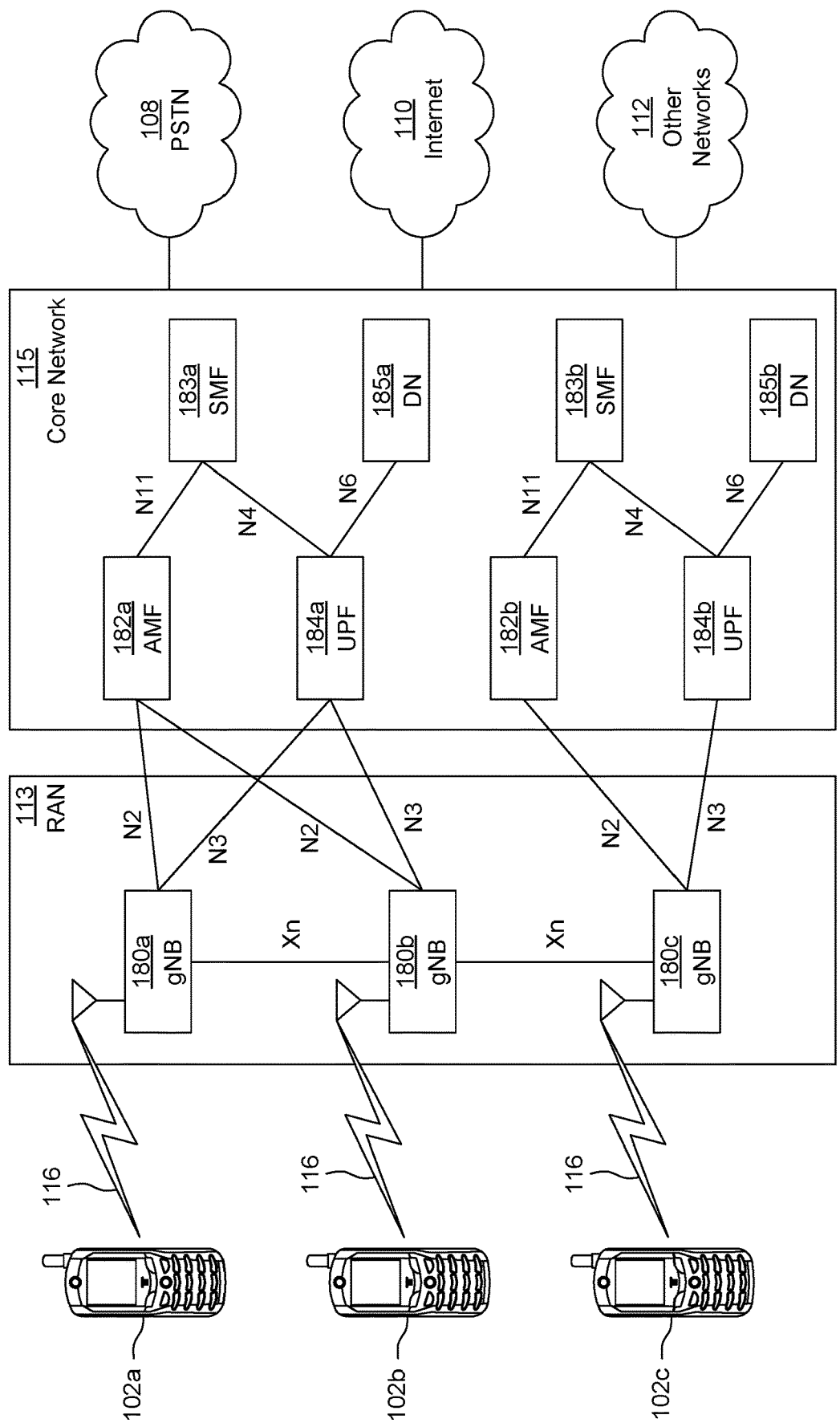
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
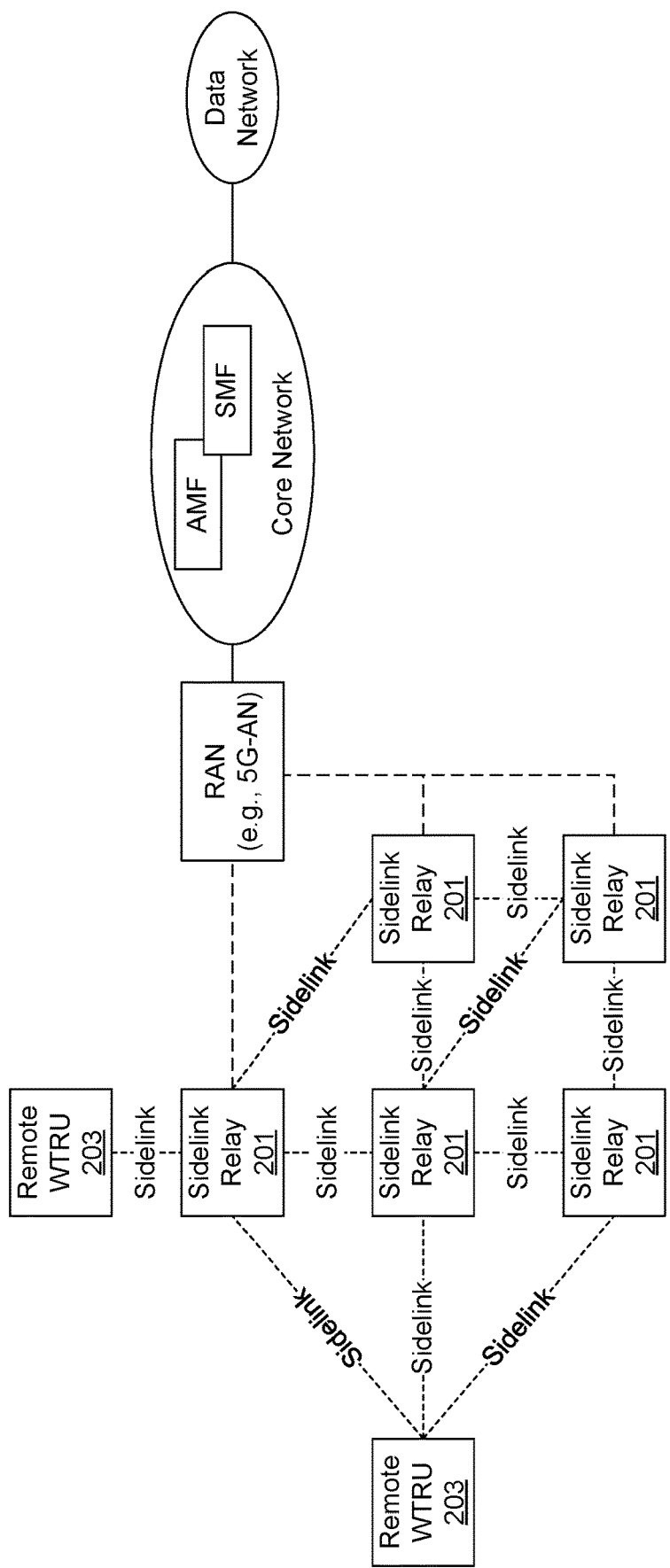
FIG. 2 is a block diagram illustrating an example of the communications system including a relay WTRU.

FIG. 2 is a block diagram illustrating an example of the communications system 100 including sidelink relays 201. Each sidelink relay 201 may be configured with, and may implement, relaying functionality to support connectivity and/or traffic relaying between any of (i) the network and a WTRU 203, (ii) the network and another sidelink relay 201, (iii) two other sidelink relays 201, (iv) another sidelink relay 201 and the WTRU 203, and (v) between two WTRUs 203. Each of the WTRUs 203 may be, for example, a WTRU 102 (FIG. 1) that may be out coverage of the RAN 113 and cannot communicate with the core network 115 directly or may be within coverage and uses a device-to-device (D2D) link (e.g., a sidelink) for communication. For ease of exposition, the terms "remote WTRU" may be used herein to refer to a WTRU (e.g., WTRU 203) that may be indirectly coupled to the network via a sidelink relay (e.g., sidelink relay 201).

Each sidelink relay 201 may be a WTRU 102 (FIG. 1) in which the relaying functionality to support connectivity and/or traffic relaying is active (and assuming the WTRU 102 (FIG. 1) is configured with such functionality). Although not shown, the sidelink relay 201 may provide connectivity and/or traffic relaying for more than one remote WTRU.

For simplicity of exposition, the sidelink relay 201 and the remote WTRU 203 are assumed to be configured in accordance with one or more protocols of proximity services (ProSe). ProSe are services that can be provided by the communications system based on a plurality of WTRUs being in proximity to each other. The terms "sidelink relay", "relay WTRU", "WTRU-to-network relay", "UE-to-network relay", WTRU-to-WTRU relay", "UE-to-UE relay", "ProSe L2 relay", "L3 relay, and "WTRU-based relay" may be used interchangeably.

Introduction

Pursuant to an approved a study item on NR sidelink relay for release 17 of the 3rd Generation Partnership Project (3GPP) memorialized by technical document ("Tdoc") RP-193253, the technical specification group (TSG) for RAN ("TSG RAN") will study the use of both UE-to-network relays and UE-to-UE relays based on PC5 (sidelink). The Tdoc RP-193253 states:

For Release 16, a first version of NR sidelink has been developed and it solely focuses on supporting V2X related road safety services. The design aims to provide support for broadcast, groupcast and unicast communications in both out-of-coverage and in-network coverage scenarios. On top of that, sidelink-based relaying functionality should be additionally studied in order for sidelink/network coverage extension and power efficiency improvement, considering wider range of applications and services.

To further explore coverage extension for sidelink-based communication,

UE-to-network coverage extension: Uu coverage reachability is necessary for UEs to reach server in PDN network or counterpart UE out of proximity area. However, release-13 solution on UE-to-network relay is limited to EUTRA-based technology, and thus cannot be applied to NR-based system, for both NG-RAN and NR-based sidelink communication.

UE-to-UE coverage extension: Currently proximity reachability is limited to single-hop sidelink link, either via EUTRA-based or NR-based sidelink technology. However, that is not sufficient in the scenario where there is no Uu coverage, considering the limited single-hop sidelink coverage.

Overall, sidelink connectivity should be further extended in NR framework, in order to support the enhanced QoS requirements.

Under the sub-heading "4.1 Objective of SI or Core part WI or Testing part WI", Tdoc RP-193253 states:

This study item targets to study single-hop NR sidelink-based relay.

1. Study mechanism(s) with minimum specification impact to support the SA requirements for sidelink-based UE-to-network and UE-to-UE relay, focusing on the following aspects (if applicable) for layer-3 relay and layer-2 relay [RAN2];
   A. Relay (re-)selection criterion and procedure;
   B. Relay/Remote UE authorization;
   C. QoS for relaying functionality;
   D. Service continuity;
   E. Security of relayed connection after SA3 has provided its conclusions;
   F. Impact on user plane protocol stack and control plane procedure, e.g., connection management of relayed connection;
2. Study mechanism(s) to support upper layer operations of discovery model/procedure for sidelink relaying, assuming no new physical layer channel/signal [RAN2]; . . . .

Relay selection/reselection for conventional ProSe UE-to-network relays is performed based on combination of access stratum (AS) layer quality measurements (e.g., reference signal receive power (RSRP) measurements) and upper layer criteria. The "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", 3GPP Technical Specification (TS) 36.300 v15.4.0 (2018-12), states:

The eNB controls whether the UE can act as a ProSe UE-to-Network Relay:

If the eNB broadcast any information associated to ProSe UE-to-Network Relay operation, then ProSe UE-to-Network Relay operation is supported in the cell;

The eNB may provide:

Transmission resources for ProSe UE-to-Network Relay discovery using broadcast signalling for RRC_IDLE state and dedicated signalling for RRC_CONNECTED state;

Reception resources for ProSe UE-to-Network Relay discovery using broadcast signalling;

The eNB may broadcasts a minimum and/or a maximum Uu link quality (RSRP) threshold(s) that the ProSe UE-to-Network Relay needs to respect before it can initiate a UE-to-Network Relay discovery procedure. In RRC_IDLE, when the eNB broadcasts transmission resource pools, the UE uses the threshold(s) to autonomously start or stop the UE-to-Network Relay discovery procedure. In RRC_CONNECTED, the UE uses the threshold(s) to determine if it can indicate to eNB that it is a Relay UE and wants to start ProSe UE-to-Network Relay discovery;

If the eNB does not broadcast transmission resource pools for ProSe-UE-to-Network Relay discovery, then a UE can initiate a request for ProSe-UE-to-Network Relay discovery resources by dedicated signalling, respecting these broadcasted threshold(s).

If the ProSe-UE-to-Network Relay is initiated by broadcast signalling, it can perform ProSe UE-to-Network Relay discovery when in RRC_IDLE. If the ProSe UE-to-Network Relay is initiated by dedicated signalling, it can perform relay discovery as long as it is in RRC_CONNECTED.

A ProSe UE-to-Network Relay performing sidelink communication for ProSe UE-to-Network Relay operation has to be in RRC_CONNECTED. After receiving a layer-2 link establishment request or TMGI monitoring request (upper layer message), as specified in TS 23.303 [62], from the Remote UE, the ProSe UE-to-Network Relay indicates to the eNB that it is a ProSe UE-to-Network Relay and intends to perform ProSe UE-to-Network Relay sidelink communication. The eNB may provide resources for ProSe UE-to-Network Relay communication.

The remote UE can decide when to start monitoring for ProSe UE-to-Network Relay discovery. The Remote UE can transmit ProSe UE-to-Network Relay discovery solicitation messages while in RRC_IDLE or in RRC_CONNECTED depending on the configuration of resources for ProSe UE-to-Network Relay discovery. The eNB may broadcast a threshold, which is used by the Remote UE to determine if it can transmit ProSe UE-to-Network Relay discovery solicitation messages, to connect or communicate with ProSe UE-to-Network Relay UE. The RRC_CONNECTED Remote UE, uses the broadcasted threshold to determine if it can indicate to eNB that it is a Remote UE and wants to participate in ProSe UE-to-Network Relay discovery and/or communication. The eNB may provide, transmission resources using broadcast or dedicated signalling and reception resources using broadcast signalling for ProSe UE-to-Network Relay Operation. The Remote UE stops using ProSe UE-to-Network Relay discovery and communication resources when RSRP goes above the broadcasted threshold.

NOTE: Exact time of traffic switching from Uu to PC5 or vice versa is up to higher layer. The Remote UE performs radio measurements at PC5 interface and uses them for ProSe UE-to-Network Relay selection and reselection along with higher layer criterion, as specified in TS 23.303 [62]. A ProSe UE-to-Network Relay is considered suitable in terms of radio criteria if the PC5 link quality exceeds configured threshold (pre-configured or provided by eNB). The Remote UE selects the ProSe UE-to-Network Relay, which satisfies higher layer criterion and has best PC5 link quality among all suitable ProSe UE-to-Network Relays.

The Remote UE triggers ProSe UE-to-Network Relay reselection when:
PC5 signal strength of current ProSe UE-to-Network Relay is below configured signal strength threshold;
It receives a layer-2 link release message (upper layer message), as specified in TS 23.303 [62], from ProSe UE-to-Network Relay.

In release 14, a study for UE-to-network relays for commercial use cases tailored to wearables and IoT devices was performed by the TSG RAN. While such study did not result in promulgation of any technical specification, a technical report (TR) provided some preferred solutions for such relays. The TR indicated that the UE-to-network relays for wearables and IoT devices were expected to use a layer 2 (L2) relaying approach (unlike ProSe UE-to-network relays, which use a layer 3 (L3) (e.g., IP layer) relaying approach).

Relay solutions in previous releases of the 3GPP LTE specifications were based on a one-to-one communication link established at upper layers (ProSe layer) between two UEs—a remote UE and a UE-to-network relay. Such connection was transparent to the AS layer and connection management signaling and procedures performed at the upper layers are carried by AS layer data channels. The AS layer is therefore unaware of such a one-to-one connection.

In NR V2X (release 16), the AS layer supports the notion of a unicast link between two UEs. Such unicast link is initiated by upper layers (as in a ProSe one-to-one connection). However, the AS layer is informed of the presence of such unicast link and any data that is transmitted in unicast fashion between the two UEs. With such knowledge, the AS layer can support HARQ feedback, CQI feedback, and power control schemes (which are specific to unicast).

A unicast link at the AS layer is supported via a PC5-RRC connection. In a draft of the "3rd Generation Partnership Project; Technical Specification Group Radio Access Network; NR; Radio Resource Control (RRC) protocol specification (Release 16)", the PC5-RRC connection is defined as follows:

"The PC5-RRC connection is a logical connection between a pair of a Source Layer-2 ID and a Destination Layer-2 ID in the AS. One PC5-RRC connection is corresponding to one PC5 unicast link [xx]. The PC5-RRC signalling, as specified in sub-clause 5.X.9, can be initiated after its corresponding PC5 unicast link establishment [xx]. The PC5-RRC connection and the corresponding sidelink SRBs and sidelink DRBs are released when the PC5 unicast link is released as indicated by upper layers.

For each PC5-RRC connection of unicast, one sidelink SRB is used to transmit the PC5-S messages before the PC5-S security has been established. One sidelink SRB is used to transmit the PC5-S messages to establish the PC5-S security. One sidelink SRB is used to transmit the PC5-S messages after the PC5-S security has been established, which is protected. One sidelink SRB is used to transmit the PC5-RRC signalling, which is protected and only sent after the PC5-S security has been established."

PC5-RRC signaling includes a sidelink (re)configuration message (RRCReconfigurationSidelink) where a first of two UEs configures the RX-related parameters of each sidelink radio bearer (SLRB) in the second UE. Such (re)configuration message can configure the parameters of each protocol in the RAN L2 stack (SDAP, PDCP, etc.). The second UE can confirm or reject such (re)configuration, depending on whether it can support the (re)configuration suggested by the first UE.

In LTE sidelink, UE-to-network relaying is supported. A UE can act as a UE-to-network relay if an RSRP measurement of a discovery message measured by a remote UE is within a configured range. Dedicated discovery resource pools are configured for the UE-to-network relay and the remote UE to support the relay selection procedure. Specifically, the remote UE performs the RSRP measurement of the discovery message in a dedicated discovery resource during the relay selection procedure. If there are multiple UE-to-network relays to select from, the remote WTRU shall select the UE-to-network relay having the highest PC5 RSRP.

In NR V2X (release 16), unicast link establishment procedure is supported. However, the procedure is handled at upper layers. When the link establishment is finished, the AS layer is informed of the presence of such unicast link by the source and destination ID for each unicast link. Then, data can be transmitted in unicast fashion between the peer UEs.

In a NR relay study item, the following is expected to be studied: (i) support of both UE-to-UE and UE-to-network relays; (ii) support service continuity; and (iii) using the existing channels (i.e., no discovery channel).

It is expected control and/or data channels (e.g., a physical sidelink control channel (PSCCH) and/or a physical downlink shared channel (PDSCH)) are to be used for relay discovery. Therefore, resource pool selection for, QoS determination for, and sidelink measurement of discovery messages need to be solved.

UE-to-UE relays should ensure service continuity and avoid service interruption for a unicast link between UEs over sidelink. Relying on upper layers only to perform relay (re)selection for UE-to-UE relays does not consider AS layer link quality and may result in service interruption. Rules for relay determination and/or relay selection that are similar to those for UE-to-network relays cannot be reused for UE-to-UE relays because the source and destination UEs are both moving in this case, and whether a UE is allowed to be a relay depends on which source and/or destination UEs it is to be a relay for. Also among the problems to be solved by the various disclosed embodiments is the problem of how the AS layer and/or other layers should be involved in the relay (re)selection of sidelink relays, including sidelink-to-sidelink relay scenarios needs.

Methods, apparatuses, systems, etc. directed to, and/or in connection with, selection and/or reselection of relays and paths are disclosed herein. Such methods, apparatuses, systems, etc., for example, may address the involvement of (methodologies and technologies configured in, implemented in and/or carried out by) the AS layer and/or other layers in selection and/or reselection of sidelink relays and paths, including WTRU-to-WTRU relay scenarios.

For simplicity of exposition, the disclosure that follows is in large part from a perspective of a WTRU (source or destination). Those of ordinary skill in the art will recognize that much of such disclosure may be equally applicable to a sidelink relay and/or a network element (e.g., a base station or other RAN element), and hence, such modifications and variations are intended to fall within the scope of the disclosure and the appended claims.

In various embodiments, a method may be implemented in a first WTRU (e.g., a source WTRU) and may include any of determining one or more first measurements based on one or more first sidelink transmissions received from a second WTRU (e.g., a sidelink relay); receiving, from the second WTRU, one or more second measurements associated with a path between the first WTRU and a third WTRU (e.g., a destination WTRU) and including the second WTRU, wherein the second measurements may be based, at least in part, on one or more second sidelink transmissions exchanged between the third WTRU and the second WTRU or between the third WTRU and a fourth WTRU (e.g., another sidelink relay); determining a measurement ("path measurement") of the path based on a at least one the first measurements and at least one of the second measurements; determining one or more transmission parameters for transmitting one or more discovery messages during a communication period based on any of the path measurement and quality of service (QoS) criteria; and transmitting the discovery messages according to the transmission parameters. The terms "a measurement of a path", "path measurement" and "combined sidelink measurement" may be used interchangeably herein.

In various embodiments, the method may include making a determination to transmit the discovery messages based on any of the QoS criteria and the path measurement, e.g., prior to determining the transmission parameters. In various embodiments, the method may be modified to include making a determination to not transmit discovery messages based on any of the QoS criteria and the path measurement, e.g., prior to determining the transmission parameters, and forego determining the one or more transmission parameters and transmitting the discovery messages according to the transmission parameters.

In various embodiments, the transmission parameters may include any of a transmit power, a number of (re)transmissions, and a periodicity for transmission of the discovery messages.

In various embodiments, the method may include triggering transmission of the discovery messages based on the QoS and the path measurement.

In various embodiments, determining the path measurement may include determining the path measurement as a function (metric) of (i) the first measurements, or (ii) the second measurements, or (iii) at least one of the first measurements and at least one of the second measurements. In various embodiments, the function may be any of a minimum RSRP and a maximum RSRP.

In various embodiments, the path measurement may include one or more metrics of (i) the first measurements, or (ii) the second measurements, or (iii) at least one of the first measurements and at least one of the second measurements. In various embodiments, the metrics nay include any of a minimum RSRP and a maximum RSRP.

In various embodiments, the second measurements may include any of a channel quality indicator (CQI), a reference signal receive power (RSRP), a reference signal receive quality (RSRQ), a pathgain, a pathloss, a distance between the first and second WTRUs, a distance between the second and third WTRUs, a reachability indicator, a channel busy ratio (CBR) of a resource pool, and a channel occupancy ratio (CR) of the second WTRU. In various embodiments, the first measurements may include any of a channel quality indicator (CQI), a reference signal receive power (RSRP), a reference signal receive quality (RSRQ), a pathgain, a pathloss, a distance between the first and second WTRUs, a channel busy ratio (CBR) of a resource pool, and a channel occupancy ratio (CR) of the first sidelink relay.

In various embodiments, the second measurements may be based (further based), at least in part, on one or more third sidelink transmissions transmitted by the first WTRU. In various embodiments, the second measurements may be based (further based), at least in part, on one or more fourth sidelink transmissions exchanged between the second WTRU and the fourth WTRU. In various embodiments, the second measurements may be based (further based), at least in part on, one or more fourth sidelink transmissions exchanged between a fifth WTRU and the fourth WTRU and one or more fifth sidelink transmissions exchanged between the second WTRU and the fifth WTRU.

In various embodiments, the path between the first WTRU and a third WTRU and including the second WTRU may be a first path, and the method may include receiving, from a sixth WTRU, a sixth sidelink transmission including a discovery message, wherein the discovery message may include one or more third measurements associated with a second path between the first WTRU and a third WTRU and including the sixth WTRU, wherein the third measurements may be based, at least in part, on one or more seventh sidelink transmissions exchanged between the third WTRU and the sixth WTRU; determining one or more fourth measurements based on the sixth sidelink transmission; determining a path measurement of the second path based on a at least one of the third measurements and at least one of the fourth measurements; and performing selection of the sixth WTRU based at least in part on the path measurement of the second path.

In various embodiments, performing selection of the sixth WTRU may include performing selection of the sixth WTRU based at least in part on the path measurement of the second path and one or more criteria. In various embodiments, the one or more criteria include any (i) a received signal strength of the message; (ii) a distance between the first and second WTRUs; (iii) a distance between the first WTRU and a third WTRU; (iv) a QoS criteria; (v) a location of the first WTRU, (vi) a location of the second WTRU; (vii) a location of the third WTRU; (viii) a CBR of a resource pool; (ix) a CR of the first WTRU; (x) speed of the second WTRU; (xi) a speed of the third WTRU, (xii) a number of relayed links, (xiii) a number of SLRBs currently established at the second WTRU; and (xiv) a previous reception of other related messages associated with a reselection event.

In various embodiments, receiving the second measurements associated with a first path may include receiving information indicating one or more metrics of one or more of the second measurements associated with first path, and determining the path measurement of the first path may include determining the path measurement of the first path based on the first measurements and the second measurements and/or the one or more metrics of one or more of the second measurements. In various embodiments, the metrics may include any of a minimum RSRP and a maximum RSRP.

In various embodiments, a method may be implemented in a first WTRU (e.g., a sidelink relay) and may include any of receiving one or more first measurements associated with a path between a second WTRU (e.g., a source (destination) WTRU) and a third WTRU (e.g., a destination (source) WTRU) and including the first WTRU, wherein the first measurements are based, at least in part, on at least one of (i) one or more first sidelink transmissions received from the second WTRU, (ii) one or more second sidelink transmissions transmitted from the first WTRU to the third WTRU or to a fourth WTRU (e.g., another sidelink relay), and (iii) one or more third sidelink transmissions exchanged between the third WTRU and the fourth WTRU or between the third WTRU and a fifth WTRU (another sidelink relay); determining one or more second measurements based on one or more fourth sidelink transmissions received from the third WTRU or the fourth WTRU; determining to trigger a reporting of one or more of the first measurements and the second measurements based on (i) a QoS (e.g., of a relay service), (ii) a channel busy ratio (CBR) of a resource pool (e.g., configured for sidelink transmissions), and (iii) one or more metrics of the one or more first measurements, or the one or more second measurements, or at least one of the one or more first measurements and at least one of the one or more second measurements; and transmitting the one or more of the first measurements and the second measurements to the second WTRU.

In various embodiments, transmitting the one or more of the first measurements and the second measurements to the second WTRU may include transmitting one or more sidelink transmissions to the second WTRU, wherein the sidelink transmissions may include the one or more of the first measurements and the second measurements.

In various embodiments, the method may include receiving information indicating that a direct communication message from the second WTRU is forthcoming. In various embodiments, the information may be, or may be received in, sidelink control information (SCI) associated with the direct communication message. In various embodiments, the direct communication message may include a relay request.

In various embodiments, a method may be implemented in a first WTRU (e.g., a source (or destination) WTRU) and may include any of obtaining one or more measurements for each of one or more other WTRUs (e.g., sidelink relays), wherein the one or more measurements for each of the other WTRUs is based at least in part on one or more sidelink transmissions exchanged between the first WTRU and the corresponding other WTRU; and performing reselection among the one or more other WTRUs based at least in part on the one or more measurements of the one or more other WTRUs.

In various embodiments, performing reselection among the other WTRUs may include performing reselection among the other WTRUs based at least part on the measurements and a quality of service (QoS) of a service. In various embodiments, performing reselection among the other WTRUs may include performing reselection among the one or more other WTRUs based at least part on the one or more measurements and a number of hops per path for one or more of a plurality of paths associated with the one or more other WTRUs. In various embodiments, performing reselection among the other WTRUs may include performing reselection among the other WTRUs based at least part the one or more measurements and any of a QoS criteria (e.g., of a service) and a number of hops per path for one or more of a plurality of paths associated with the one or more other WTRUs. In various embodiments, performing reselection among other WTRUs may include performing reselection among the other WTRUs based at least part on the one or more measurements and load information of any of the other WTRUs and the first WTRU. In various embodiments, performing reselection among the other WTRUs may include performing reselection among the other WTRUs based at least part on the one or more measurements and load information of any of the other WTRUs, the first WTRU and a network element.

In various embodiments, obtaining the measurements may include determining at least some of the one or more measurements. In various embodiments, determining the one or more measurements may include determining a measurement of each of a plurality of paths associated with the one or more other WTRUs. In various embodiments, determining a measurement of each of the plurality of paths may include determining the measurement of each of the plurality of paths based on one or more measurements of one or more sidelink transmission occurring on some or all hops of such path.

In various embodiments, the measurement of at least one path of the plurality of paths may be any of a sidelink reference signal receive power ("SL-RSRP") measurement of a hop of the at least one path of the plurality of paths and an accumulated SL-RSRP of a hop of the at least one path of the plurality of paths. In various embodiments, the measurement of at least one path of the plurality of paths is a combination of SL-RSRP measurements of a plurality of hops of the at least one path of the plurality of paths. In various embodiments, the measurement of at least one hop of at least one path of the plurality of paths may include any of a measurement of a sidelink transmission received by the WTRU, an accumulation or other combination of measurements of sidelink transmissions received by the WTRU, a one or more reported measurement of a transmission, and a reported accumulation or other combination of measurements of sidelink transmissions.

In various embodiments, the method may include determining a measurement for at least one hop of at least one path of the plurality of paths. In various embodiments, determining the one or more measurements may include determining a measurement for one or more sidelink transmission occurring on at least one hop of at least one path of the plurality of paths. In various embodiments, determining a measurement for at least one hop of at least one path of the plurality of paths comprises determining the measurement using and/or as a function of, any of a measurement of a sidelink transmission received by the WTRU, an accumulation or other combination measurements of sidelink transmissions received by the WTRU, a reported measurement of a sidelink transmission, and a reported accumulation or other combination of measurements of sidelink transmissions. In various embodiments, determining a measurement for at least one hop of at least one path of the plurality of paths may include determining the measurement using and/or as a function of, any of a measurement of a sidelink data transmission and a measurement a direct communication message transmission. In various embodiments, determining a measurement for at least one hop of at least one path of the plurality of paths may include determining the measurement using and/or as a function of, any of a measurement of a sidelink data transmission and a measurement a sidelink discovery message transmission.

In various embodiments, a method may be implemented in a first WTRU (e.g., a sidelink relay) and may include any of receiving, from a second WTRU (e.g., a source WTRU, destination WTRU or another sidelink relay), a first sidelink transmission including a message; determining a measurement of the first sidelink transmission; determining to forward the message based on one or more criteria, including the measurement of the first sidelink transmission; and transmitting a second sidelink including the message and the measurement of the first sidelink transmission. In various embodiments the message may be a direct communication message. In various embodiments, the criteria may include any (i) a received signal strength of the message; (ii) a distance between the first and second WTRUs; (iii) a distance between the first WTRU and a third WTRU; (iv) a QoS criteria; (v) a location of the first WTRU, (vi) a location of the second WTRU; (vii) a location of the third WTRU; (viii) a CBR of a resource pool; (ix) a CR of the first WTRU; (x) speed of the second WTRU; (xi) a speed of the third WTRU, (xii) a number of relayed links, (xiii) a number of SLRBs currently established at the second WTRU; and (xiv) a previous reception of other related messages associated with a reselection event.

In various embodiments, a method may be implemented in a first WTRU (e.g., a source (or a destination) WTRU) and may include any of receiving, from a second WTRU (e.g., a sidelink relay), a first sidelink transmission including a discovery message, wherein the discovery message may include one or more first measurements associated with a path between the first WTRU and a third WTRU and including the second WTRU, wherein the first measurements may be based, at least in part, on one or more second sidelink transmissions exchanged between the third WTRU and the second WTRU; determining one or more second measurements based on the first sidelink transmission; determining a path measurement of the path based on at least one of the first measurements and at least one of the second measurements; and performing selection of the second WTRU based at least in part on the path measurement of the second path. In various embodiments, performing selection of the second WTRU comprises performing selection of the second WTRU based at least in part on the path measurement of the path and one or more criteria. In various embodiments, the criteria may include any (i) a received signal strength of the message; (ii) a distance between the first and second WTRUs; (iii) a distance between the first WTRU and a third WTRU; (iv) a QoS criteria; (v) a location of the first WTRU, (vi) a location of the second WTRU; (vii) a location of the third WTRU; (viii) a CBR of a resource pool; (ix) a CR of the first WTRU; (x) speed of the second WTRU; (xi) a speed of the third WTRU, (xii) a number of relayed links, (xiii) a number of SLRBs currently established at the second WTRU; and (xiv) a previous reception of other related messages associated with a reselection event.

In various embodiments, methods for, and/or for use in connection with, performing relay selection or reselection ("(re)selection") may be implemented in a first WTRU. Among such methods is a method that may include any of receiving, from one or more sidelink relays, one or more sidelink measurements associated with a path defining a plurality of hops, including (i) a first hop between the first WTRU and a first of the one or more sidelink relays and (ii) a second hop between the first or a second of the one or more sidelink relays and a second WTRU or a network element; and on condition that the one or more sidelink measurements satisfy a QoS-dependent condition: triggering a selection or a re-selection of the first sidelink relay; and/or causing a selection or a re-selection of the second sidelink relay.

In various embodiments, causing a selection or a re-selection of the second sidelink relay may include transmitting one or more messages to one or more of the first sidelink relay, the second WTRU and any of the sidelink relays within one hop of the second sidelink relay, wherein the one or more messages indicate to select or reselect to the second sidelink relay.

In various embodiments, triggering selection or re-selection of the first sidelink relay may include any of determining one or more transmission period (TP) resources to use for transmissions during one or more TPs within an upcoming communication period; and transmitting any of a direct communication message and a retransmission of the direct communication message using the one or more TP resources during the one or more TPs.

In various embodiments, the method may include determining the one or more TPs within an upcoming communication period.

In various embodiments, the method may include indicating in sidelink control information (SCI) that the direct communication message comprises a relay request.

In various embodiments, the direct communication message may include a relay request and/or be a relay request message.

In various embodiments, determining one or more TP resources may include determining a pattern of the one or more TP resources to use for transmissions during the one or more TPs within the upcoming communication period.

In various embodiments, determining one or more TP resources may include determining the one or more TP resources and a periodicity for the one or more TP resources to use for transmissions during of the one or more TPs within the upcoming communication period.

In various embodiments, transmitting any of a direct communication message and a retransmission of the direct communication message using the one or more TP resources may include transmitting any of a direct communication message and a retransmission of the direct communication message using the one or more TP resources during any TP of the one or more TPs.

In various embodiments, determining one or more TP resources to use for transmissions during one or more TPs may include determining the one or more TP resources based on any of the one or more sidelink measurements, a quality of service (QoS) of a service and a number of hops of a current relay path.

In various embodiments, determining the one or more TPs may include determining the one or more TPs based on any of the one or more sidelink measurements, a quality of service (QoS) of a service and a number of hops of a current relay path.

In various embodiments, determining one or more TP resources and a periodicity for the one or more TP resources to use for transmissions during a plurality of TPs is based on any of the one or more sidelink measurements, a QoS of a service and a number of hops of a current relay path.

In various embodiments, the one or more sidelink measurements may include first and second sidelink measurements associated with the first and second hops, respectively. In various embodiments, the one or more sidelink measurements may include a first sidelink measurement associated with the first hop. In various embodiments, the one or more sidelink measurements may include a second sidelink measurement associated with the second hop.

In various embodiments, the second sidelink measurement may include any of a channel quality indicator (CQI), a reference signal receive power (RSRP), a reference signal receive quality (RSRQ), a pathgain, a pathloss, a distance between the first or second sidelink relay and the second WTRU, a reachability indicator (e.g., whether the second WTRU is reachable or unreachable), a channel busy ratio (CBR) of a resource pool configured for sidelink transmission, and a channel occupancy ratio (CR) of the first or second sidelink relay.

In various embodiments, the first sidelink measurement may include any of a CQI, an RSRP, an RSRQ, a pathgain, a pathloss, a distance between the first sidelink relay and the first WTRU, a CBR of a resource pool configured for sidelink transmission, and a CR of the first sidelink relay.

In various embodiments, the first and second sidelink measurements may be different types of sidelink measurements. In various embodiments, the communication period may be a maximum communication request time.

In various embodiments, the one or more TP resources to use for transmissions during one or more TPs may include at least one TP resource to use during a single TP, and determining one or more TP resources may include selecting at least one TP resource to use during a single TP based on a resource selection window. In various embodiments, the resource selection window begins at a first time n and ends at a second time n+T. In various embodiments, the first time n corresponds to when selection or re-selection of the first sidelink relay is triggered, and wherein T is based on a latency metric.

In various embodiments, the first WTRU may be a source WTRU and the second WTRU may be a destination WTRU. In various embodiments, the source WTRU may receive, from a sidelink relay, RSRP measurements of a first hop between the source WTRU and sidelink relay and a second hop between sidelink relay and the destination WTRU. In various embodiments, the source WTRU may trigger relay (re)selection on condition that the combined RSRP measurements satisfy the QoS-dependent condition (e.g., based on a minimum of the two RSRP measurements).

In various embodiments, methods for, and/or for use in connection with, performing relay selection or reselection ("(re)selection") may be implemented in a sidelink relay. Among such methods is a method that may include any of receiving one or more sidelink measurements associated with a path defining a plurality of hops, including (i) a first hop between a first wireless transmit receive unit (WTRU) and a first of one or more sidelink relays and (ii) a second hop between the first or a second of the one or more sidelink relays and a second WTRU or a network element; and transmitting the one or more sidelink measurements to the first WTRU.

In various embodiments, transmitting the one or more sidelink measurements to the first WTRU may include transmitting the one or more sidelink measurements to the first WTRU via a direct link between the sidelink relay and the first WTRU.

In various embodiments, the sidelink relay may be the first sidelink relay. In various embodiments, the sidelink relay may be the second sidelink relay.

In various embodiments, the method may include receiving information (e.g., signaling an/or signaling including information) indicating that a direct communication message from the first WTRU is forthcoming. In various embodiments, the information may be, or may be received in, sidelink control information (SCI) associated with the direct communication message.

In various embodiments, the method may include obtaining one or more sidelink measurements associated with the first hop in connection with receipt of the direct communication message from the first WTRU. In various embodiments, obtaining one or more sidelink measurements may include measuring the one or more sidelink measurements associated with the first hop in connection with receiving the direct communication message from the first WTRU. In various embodiments, obtaining one or more sidelink measurements may include receiving the one or more sidelink measurements associated with the first hop from the first sidelink relay.

In various embodiments, the method may include adapting the direct communication message to include or indicate the one or more sidelink measurements associated with the first hop.

In various embodiments, the method may include transmitting the adapted direct communication message to or toward the second WTRU.

In various embodiments, the direct communication message may include a relay request and/or may be relay request message.

In various embodiments, the first sidelink relay may receive RSRP measurement in the second hop (e.g., from a destination WTRU), and forward the RSRP measurement to the first WTRU (e.g., for the relay reselection trigger).

In various embodiments, the first sidelink relay may start measuring RSRP following reception of an SCI indicating a relay request message (e.g., for relay selection).

In various embodiments, the first sidelink relay may including the RSRP measurement of the first hop in the relay request message, and may forwarding it to the destination WTRU.

In various embodiments, a method for, and/or for use in connection with, performing path selection or reselection ("(re)selection") may be implemented in a first WTRU and may include any of receiving, from one or more sidelink relays, one or more sidelink measurements associated with each of a plurality of paths, wherein each path defines a plurality of hops, including (i) a first hop between the first WTRU and a first of the one or more sidelink relays and (ii) a second hop between the first or a second of the one or more sidelink relays and a second WTRU or a network element; and performing path selection among the plurality of paths based at least part of the one or more sidelink measurements.

In various embodiments, performing path selection among the plurality of paths may include performing path selection among the plurality of paths based on the one or more sidelink measurements along with a quality of service (QoS) of a service.

In various embodiments, performing path selection among the plurality of paths may include performing path selection among the plurality of paths based on the one or more sidelink measurements along with a number of hops per path for one or more of the plurality of paths.

In various embodiments, performing path selection among the plurality of paths may include performing path selection among the plurality of paths based on the one or more sidelink measurements along with any of a quality of service (QoS) of a service and a number of hops per path for one or more of the plurality of paths.

In various embodiments, the first WTRU may be a destination WTRU. In various embodiments, the first WTRU may be a source WTRU.

In various embodiments, performing path selection among the plurality of paths may include performing path selection among the plurality of paths based on the sidelink measurements and on load information of any of the one or more sidelink relays, the second WTRU and the network element.

In various embodiments, the method may include determining the sidelink measurements. In various embodiments, determining the sidelink measurements may include determining a sidelink measurement of each of the plurality of paths. In various embodiments, determining a sidelink measurement of each of the plurality of paths may include determining the sidelink measurement of each of the plurality of paths based on one or more sidelink measurements of some or all hops of such path.

In various embodiments, the sidelink measurement of at least one path of the plurality of paths may be any of a SL-RSRP measurement of a hop of the at least one path of the plurality of paths and an accumulated SL-RSRP of a hop of the at least one path of the plurality of paths. In various embodiments, the sidelink measurement of at least one path of the plurality of paths may be a combination of SL-RSRP measurements of a plurality of hops of the at least one path of the plurality of paths. In various embodiments, the sidelink measurement of at least one hop of at least one path of the plurality of paths may include any of a sidelink measurement of a transmission received by the WTRU, an accumulation or other combination sidelink measurements of transmissions received by the WTRU, a reported/forwarded sidelink measurement of a transmission transmitted by any of a sidelink relay, another WTRU and a base station, and/or a reported/forwarded accumulation or other combination of sidelink measurements of transmissions transmitted by any of a sidelink relay, another WTRU and a base station.

In various embodiments, the method may include determining a sidelink measurement for at least one hop of at least one path of the plurality of paths. In various embodiments, determining the one or more sidelink measurements may include determining a sidelink measurement for at least one hop of at least one path of the plurality of paths. In various embodiments, determining a sidelink measurement for at least one hop of at least one path of the plurality of paths may include determining the sidelink measurement using and/or as a function of, any of a sidelink measurement of a transmission received by the WTRU, an accumulation or other combination sidelink measurements of transmissions received by the WTRU, a reported/forwarded sidelink measurement of a transmission transmitted by any of a sidelink relay, another WTRU and a base station, and/or a reported/forwarded accumulation or other combination of sidelink measurements of transmissions transmitted by any of a sidelink relay, another WTRU and a base station. In various embodiments, determining a sidelink measurement for at least one hop of at least one path of the plurality of paths may include determining the sidelink measurement using and/or as a function of, any of a sidelink measurement of a data transmission and a sidelink measurement a direct communication message transmission. In various embodiments, determining a sidelink measurement for at least one hop of at least one path of the plurality of paths may include determining the sidelink measurement using and/or as a function of, any of a sidelink measurement of a data transmission and a sidelink measurements a discovery message transmission.

In various embodiments, a method may be implemented in a first WTRU (e.g., a source (or a destination) WTRU) and may include any of receiving, from one or more sidelink relays, one or more sidelink measurements associated with each of a plurality of paths, wherein each path defines a plurality of hops, including (i) a first hop between the first WTRU and a first of the one or more sidelink relays and (ii) a second hop between the first or a second of the one or more sidelink relays and a second WTRU or a network element; and performing (re)selection among the one or more sidelink relays based at least part of the one or more sidelink measurements.

In various embodiments, performing (re)selection among the one or more sidelink relays may include performing (re)selection among the one or more sidelink relays based on the one or more sidelink measurements along with a QoS criteria (e.g., of a service). In various embodiments, performing (re)selection among the one or more sidelink relays may include performing (re)selection among the one or more sidelink relays based on the one or more sidelink measurements along with a number of hops per path for one or more of the plurality of paths.

In various embodiments, performing (re)selection among the one or more sidelink relays may include performing (re)selection among the one or more sidelink relays based on the one or more sidelink measurements along with any of a QoS criteria (e.g., of a service) and a number of hops per path for one or more of the plurality of paths. In various embodiments, performing (re)selection among the one or more sidelink relays may include performing (re)selection among the one or more sidelink relays based on the one or more sidelink measurements and on load information of any of the one or more sidelink relays, the second WTRU and the network element.

In various embodiments, the method may include determining the one or more sidelink measurements. In various embodiments, determining the one or more sidelink measurements may include determining a sidelink measurement of each of the plurality of paths. In various embodiments, determining a sidelink measurement of each of the plurality of paths may include determining the sidelink measurement of each of the plurality of paths based on one or more sidelink measurements of some or all hops of such path.

In various embodiments, the sidelink measurement of at least one path of the plurality of paths may be any of a SL-RSRP measurement of a hop of the at least one path of the plurality of paths and an accumulated SL-RSRP of a hop of the at least one path of the plurality of paths. In various embodiments, the sidelink measurement of at least one path of the plurality of paths may be a combination of SL-RSRP measurements of a plurality of hops of the at least one path of the plurality of paths. In various embodiments, the sidelink measurement of at least one hop of at least one path of the plurality of paths may include any of a sidelink measurement of a transmission received by the WTRU, an accumulation or other combination sidelink measurements of transmissions received by the WTRU, a reported/forwarded sidelink measurement of a transmission transmitted by any of a sidelink relay, another WTRU and a base station, and/or a reported/forwarded accumulation or other combination of sidelink measurements of transmissions transmitted by any of a sidelink relay, another WTRU and a base station.

In various embodiments, the method may include determining a sidelink measurement for at least one hop of at least one path of the plurality of paths. In various embodiments, determining the one or more sidelink measurements may include determining a sidelink measurement for at least one hop of at least one path of the plurality of paths. In various embodiments, determining a sidelink measurement for at least one hop of at least one path of the plurality of paths may include determining the sidelink measurement using and/or as a function of, any of a sidelink measurement of a transmission received by the WTRU, an accumulation or other combination sidelink measurements of transmissions received by the WTRU, a reported/forwarded sidelink measurement of a transmission transmitted by any of a sidelink relay, another WTRU and a base station, and/or a reported/forwarded accumulation or other combination of sidelink measurements of transmissions transmitted by any of a sidelink relay, another WTRU and a base station. In various embodiments, determining a sidelink measurement for at least one hop of at least one path of the plurality of paths may include determining the sidelink measurement using and/or as a function of, any of a sidelink measurement of a data transmission and a sidelink measurement a direct communication message transmission. In various embodiments, determining a sidelink measurement for at least one hop of at least one path of the plurality of paths may include determining the sidelink measurement using and/or as a function of, any of a sidelink measurement of a data transmission and a sidelink measurements a discovery message transmission.

In various embodiments, an apparatus, which may include any of a processor and memory, configured to perform a method as in at least one of the preceding embodiments.

In various embodiments, the apparatus may be, be configured as and/or configured with elements of a WTRU. In various embodiments, the apparatus may be, be configured as and/or configured with elements of a sidelink relay. In various embodiments, the apparatus may be, be configured as and/or configured with elements of a base station or other network (e.g., RAN) element.

A WTRU may engage in a direct communication with (i) another WTRU via any of a direct link between the two WTRUs and one or more sidelink relays, or (ii) a network element via one or more sidelink relays. A direct communication may be established at one or more layers of a communications protocol stack, and a communication may be considered a direct communication if, at any of the one or more layers, sidelink communication is involved. A WTRU may transmit to one or more WTRUs and/or a network element one or more direct communication messages to (i) engage the one or more WTRUs and/or network element in one or more direct communications, and/or (ii) change or cause a change in one or more direct communications with the one or more other WTRUs and/or the network element.

Examples of the direct communication message may include an (e.g., upper layer) message intended for link establishment, a discovery message, a combination of an upper layer message and an access stratum (AS) layer message, a response message (e.g., a message sent in response to a direct communication message), a data transmission, etc. An example of the message intended for link establishment may be a PC5 signaling (PC5-S) direct communication request message (or "DIRECT_COMM_REQ" message). The discovery message may be one that is triggered and/or sent by an upper layer or by the AS layer. The combined upper layer and AS layer messages may be, for example, an upper layer message encapsulated into an AS layer message, such as a PC5-RRC message with an upper layer container.

The direct communication message may include various information, such as any of: (i) a source identifier (ID); (ii) a destination (ID), (iii) information related to an offered service and a corresponding QoS; (iv) target user information; (v) relay related information, such as, for example, any of whether a service allows relaying, a number of hops (e.g., a maximum number of hops), and one or more relay IDs; and (vi) authentication information. such as, for example, information to support security protection (e.g., information used to support security protection).

Representative Methods for Triggering/Performing a Relay (Re)Selection Procedure A WTRU (e.g., the AS layer thereof) may receive from upper layers, and/or be informed by upper layers of, a specific message (e.g., a direct communication message). In one approach, the AS layer may receive an indication from the upper layer(s) of the presence of a direct communication message. Alternatively, the WTRU may be (pre-)configured with one or more dedicated logical channels (LCHs) associated with the direct communication message. The WTRU may perform one or more procedures described herein following reception of a direct communication message.

The WTRU (e.g., the AS layer thereof) may trigger a relay (re)selection procedure based on one or more events and/or factors. The events and/or factors, for example, may occur at, and/or be considered by, the AS layer. Examples of the events and/or factors may include any of the following: (i) detection of a radio link failure (RLF) with a sidelink relay; (ii) a determination of whether a measured channel busy ratio (CBR) satisfies (e.g., exceeds) a threshold; (iii) a determination of whether a measured channel occupancy ratio (CR) satisfies (e.g., exceeds) a threshold; (iv) a determination of whether a number of HARQ DTX associated with transmissions to a sidelink relay satisfies (e.g., has reached) a threshold; (v) an RSRP and/or a CQI measurement reported by the sidelink relay satisfies a (e.g., exceeds) a threshold; (vi) combined RSRP/CQI measurements over multiple hops (as described herein) satisfies a (e.g., (e.g., exceeds) a threshold; (vii) an expiration of an inactivity timer (e.g., the relay (re)selection may be triggered following expiry of a time period during which the WTRU has not performed any transmissions to, and/or receptions from, the sidelink relay).

Other examples of the events may include receiving from a peer WTRU and/or a sidelink relay an indication of an event that the peer WTRU and/or sidelink relay may have detected with respect to a (e.g., next) hop, which event may be similar to those above. For example, the indication may indicate that the peer WTRU and/or sidelink relay has experienced an RLF on a link associated with the same relayed link and/or path (e.g., a next hop). Alternatively, and/or additionally, the indication may indicate that the peer WTRU and/or sidelink relay received RSRP measurements of a link associated with the same relayed link and/or path (e.g., a next hop) satisfies (e.g., has fallen below) a threshold. Alternatively, and/or additionally, the indication indicates that a number of consecutive HARQ DTX on transmissions of the peer WTRU satisfies (e.g., has reached) a threshold. Alternatively, and/or additionally, the indication indicates that a number of consecutive HARQ DTX on transmissions of the sidelink relay satisfies (e.g., has reached) a threshold.

Triggering (re)selection may include any of the following. The WTRU (e.g., the AS layer thereof) may inform upper layers that triggering of relay (re)selection is warranted (e.g., based on the events and/or factors). The WTRU (e.g., the AS layer thereof) may inform upper layers that triggering of relay (re)selection is warranted with an expectation of receiving a direct communication message from upper layers in response and receive the direct communication message from upper layers. The WTRU (e.g., the AS layer thereof) may initiate transmission of a direct communication message or related message. The WTRU may transmit a direct communication message.

When relay (re)selection is triggered (e.g., in connection with the WTRU determining to transmit a direct communication message), the WTRU may perform any of the following. The WTRU may take various actions to avoid or limit unnecessary measurements (and hence, battery usage), including suspending or cancelling some or all relay evaluation measurements (e.g., measurements for determining whether to perform relay (re)selection). The WTRU may prioritize transmission of any subsequent direct communication message received from upper layers. The WTRU may initiate and/or change the scheduling of various measurements, such as, for example, initiating CQI measurement to be performed by the peer WTRU and/or sidelink relay, and/or instructing a peer WTRU and/or sidelink relay to initiate CQI measurement with its own peer WTRU and/or sidelink relay (e.g., a next hop).

A WTRU may determine and/or apply a processing behavior for a message (e.g., a direct communication message). The processing behavior may include a pre-transmission behavior and/or a transmission behavior.

A message (e.g., a direct communication message) may be triggered/generated at upper layers. The pre-transmission behavior may be used to determine (e.g., help the WTRU to determine) whether to generate and/or transmit the message and/or whether the message should be generated/transmitted. The pre-transmission behavior may include various actions carried out by the WTRU prior to performing transmission(s) of the message, if any. The various actions may include any of the following actions:

the AS layer may report to upper layers various sidelink measurements, such as, e.g., sidelink measurements per hop for one or more (e.g., each) hops, combined sidelink measurements for a plurality of hops, a reachability indication to a destination WTRU, etc.;

the AS layer may indicate to upper layers the necessity of transmission of a message (e.g., a direct communication message) and/or that transmission of the message (e.g., a direct communication message) is warranted; and the WTRU may trigger transmission(s) of a message (e.g., a direct communication message), for example, the WTRU may determine whether to transmit and/or whether the message should be transmitted.

The transmission behavior may include transmission(s) of one or more transport blocks (TBs) associated with the message. The transmission behavior may include any of the following parameters for transmission(s) of a message (e.g., a direct communication message):

a priority of the message, which may be indicated in the SCI of the corresponding transmission of the message and/or which may be applicable to a single or a plurality of transmission periods (TPs);

a latency of a TB, which may be applicable to a single or a plurality of TPs and/or which may be (e.g., determined) based on a minimum and/or a maximum value of timer (e.g., T2) associated with a resource selection window (e.g., for a single TP);

a number of retransmissions, which may be applicable to a single or a plurality of TPs;

a number of subchannels that may be used for one transmission of one message, which may be applicable to a single or a plurality of TPs;

a modulation and coding scheme (MCS) which may be applicable to a single or a plurality of TPs;

a transmission power, which may be applicable to a single or a plurality of TPs;

a reference signal (RS) pattern (e.g., a demodulation reference signal (DMRS) pattern) of a physical sidelink shared channel (PSSCH), which may be applicable to a single or a plurality of TPs;

a duration of one or more TPs (For example, the WTRU may determine to transmit a message (e.g., a direct communication message) in multiple transmission periods. The WTRU may determine the duration of one transmission period, which may be used to perform (re)transmission of one TB);

a maximum communication request time (For example, the maximum communication request time may be used to determine whether a current unicast session between the source and destination WTRUs may (or should) be maintained. If the source WTRU does not receive a response from the destination WTRU within the maximum communication request time, the source WTRU may stop the transmission session among the WTRUs. Alternatively, if the source WTRU receives the response within the maximum communication request time, the source WTRU may continue the transmission session among the WTRUs);

a resource pool used for the transmission of the message;
other transmission parameters applicable to a singe TP;
other parameters applicable to a plurality of TPs; and
parameters applicable to a communication period.

Figure 3:
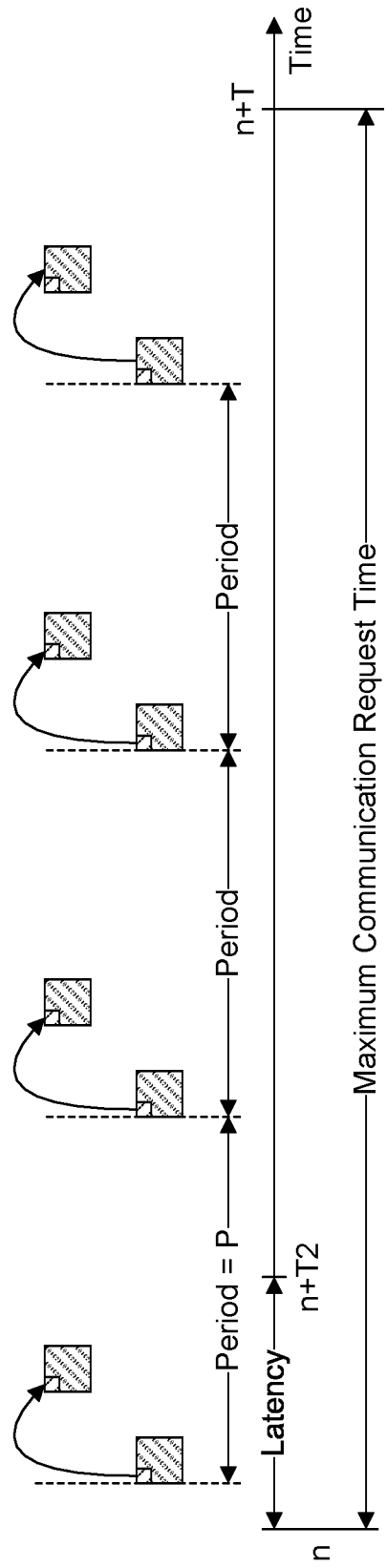
FIG. 3 illustrates an example transmission behavior of a direct communication message.

FIG. 3 illustrates an example transmission behavior of a direct communication message. A WTRU may trigger resource selection for a direct communication message at time n. The WTRU may determine to perform two transmissions (e.g., an initial transmission and a retransmission) of the direct communication message within a TP, P. The WTRU may perform resource selection for a first TB from among various resources falling within a resource selection window before time n+T2. The WTRU may determine the maximum communication request time as n+T. The maximum communication request time may include 3 TPs, each of which may include resources that may be selected for transmission of the direct communication message (e.g., one or more TBs thereof).

A WTRU may associate a direct communication message with an established link. The link may include and/or define one or more sidelink radio bearers (SLRBs), QoS flows, etc. The WTRU may determine the association based on various information, including any of upper layer information, time from a resource reselection trigger and LCH association. For example, the WTRU may receive a L2 destination ID with the direct communication message and may associate the direct communication with a unicast link and/or one or more SLRBs configured for that link. As another example, the WTRU may trigger a resource reselection for a particular unicast link and/or one or more SLRB(s), and may associate a direct communication message (e.g., the first in time) received from upper layers following a trigger with such link. Alternatively, and/or additionally, the WTRU may associate an LCH with each unicast link and/or SLRBs, and may associate any direct communication message received on the LCH with that link and/or SLRBs.

A WTRU may determine the processing behavior of a message (e.g., a direct communication message) based on various information, including any of a type of message ("message type"), a type of service ("service type"), supported WTRU types, a QoS of the service associated with the message, a number of hops of the current path, a maximum number of hops allowed for the service, a combined sidelink measurement of a current path, a CBR of a resource pool measured by any WTRU and/or sidelink relay in a current path, a CR of the WTRU and/or sidelink relay, a location of the WTRU and/or sidelink relay (possibly in conjunction with the location of another WTRU and/or sidelink relay), a measurement of a Uu interface ("Uu measurement"), and information from upper layers, Message Type The WTRU may determine the transmission behavior of a message based on the type of message. For example, the WTRU may determine the transmission parameters of a direct communication message. The WTRU may be (pre-)configured with a set (e.g., a range) of values for each of the parameters of the transmission behavior (e.g., priority, latency, periodicity, reliability, etc.) for one type of message (e.g., a direct communication message). The WTRU may determine which of the values of each parameter to select based on other criteria. For example, the WTRU may be configured with a set of DMRS patterns for the direct communication message, and may determine which of the DMRS patterns to select based on a speed of the WTRU.

Service Type and Supported WTRU Types.

The WTRU may determine a resource pool to use for selection of resources for transmitting a message associated with a service (e.g., a direct communication message) based on the type of service and/or the supported WTRU types in the service. For example, the WTRU may be (pre-)configured with multiple resource pools from which to select resources to use for transmitting a direct communication message. The multiple resource pools may include a dedicated resource pool and a shared resource pool. The shared resource pool may be used for transmission of data and/or direct communication messages. The WTRU may select the dedicated resource pool to use for transmitting a direct communication message if the service supports reduced sensing capability WTRUs (e.g., pedestrian UEs (PUEs)). The WTRU may select the shared resource pool to use for transmitting a direct communication message if the service supports the communications among full sensing capability WTRUs (e.g., vehicle UEs (VUEs)) only.

QoS of Service Associated with Message

The WTRU may trigger transmission(s) of a direct communication message to (re)select a path for communication with other WTRU(s). The WTRU may determine a transmission behavior of the direct communication message based on a QoS of the service the WTRU wants to (re)establish with one or more other WTRUs. The WTRU may use a first transmission behavior (e.g., a transmission behavior with high transmission priority, a large number of retransmissions, low maximum communication request time, higher transmission power, etc.) for a service requiring a low service interruption time. Alternatively, the WTRU may use a second transmission behavior (e.g., compared to the first transmission behavior, this transmission behavior may have lower priority, a smaller number of retransmissions, higher maximum communication request time, etc.) for a service that is not sensitive to service interruption(s).

The parameters used for the first and/or the second transmission behavior may be (pre-) configured and/or determined by the WTRU. For example, the WTRU may determine a periodicity, a number of TPs, and a number of retransmissions applicable to one or more TPs (such as disclosed herein) for transmission of the direct communication message based on the QoS of the service associated with the direct communication. The WTRU may determine the QoS of the service associated with the direct communication message based on whether the message is being sent to facilitate and/or enable continuity of an ongoing service. For example, the WTRU may trigger resource selection while configured with one or more SLRBs associated with relayed traffic. The WTRU may determine the transmission behavior of the direct communication based on the parameters associated with the established SLRBs. For example, a WTRU may be configured with a transmission behavior for the direct communication associated with each SLRB configuration. Alternatively, the WTRU may be configured with a transmission behavior for the direct communication associated with one or more QoS profiles of one or more QoS flows mapped to the established bearers.

Number of Hops of Current Path and/or Allowed for the Service.

The WTRU may determine the transmission behavior of a direct communication message based on the number of hops for an ongoing link (e.g., an SLRB) to which the direct communication message is associated (e.g., the direct communication may be associated with relay reselection for an ongoing link/SLRB) and/or the maximum number of hops allowed for the service/SLRB associated with the direct communication message. For example, the WTRU may use a first transmission behavior if the current or maximum number of hops allowed for the service satisfies (e.g., is smaller than) a threshold and use a second transmission behavior if the current or maximum number of hops allowed for the service fails to satisfy (e.g., is larger than) the threshold and/or satisfies or fails to satisfy another threshold.

Combined Sidelink Measurement of Current Path.

The WTRU may determine the transmission behavior of a message based on a combined sidelink measurement and/or any sidelink measurement of a current path. For example, the WTRU may determine a pre-transmission behavior of a direct communication message (e.g., trigger transmission of the message) when the combined RSRP measurement of two hops satisfies a condition (e.g., satisfies (e.g., is smaller than) a first threshold). The WTRU may use a first transmission behavior when the combined RSRP measurement of two hops satisfies (e.g., is smaller than) the first threshold and/or satisfies (e.g., is larger than) a second threshold. For example, the WTRU may use a first transmission behavior when the combined RSRP measurement of two hops is between the first and second threshold. The WTRU may use a second transmission behavior if the combined RSRP measurement of two hops satisfies (e.g., is smaller than) a third threshold and/or one hop in the path is not reachable. The parameters used for the first and/or the second transmission behavior may be (pre-)configured and/or determined by the WTRU.

CBR of Resource Pool (e.g., Measured by any WTRU) in Current Path and/or CR of WTRU and/or Sidelink Relay.

The WTRU may determine a pre-transmission behavior of a direct communication message (e.g., whether to trigger transmission(s) of a direct communication message) based on a CBR of a resource pool and/or a CR of the WTRU and/or sidelink relay. The WTRU may trigger one or more transmissions of the message if the CBR satisfies (e.g., is smaller than) a threshold and/or the CR satisfies (e.g., is smaller than) a threshold.

The WTRU may determine a transmission behavior of a direct communication message based on the CBR of the resource pool and/or the CR of the WTRU and/or sidelink relay. The WTRU may use a first transmission behavior if CBR satisfies (e.g., is smaller than) a first threshold and/or the CR satisfies (e.g., is smaller than) a second threshold. The WTRU may use a second transmission behavior if CBR fails to satisfy (e.g., is larger than) the first threshold or satisfies another threshold and/or the CR fails to satisfy (e.g., is larger than) the second threshold or satisfies another threshold.

WTRU and/or Sidelink Relay Location and/or Uu Measurement

The WTRU may determine a processing behavior of a message (e.g., a direct communication message) based on a location of the WTRU and/or a sidelink relay, and/or one or more Uu measurements between the WTRU and the network. For example, the WTRU may be (pre-)configured with a set of zones and/or locations to initiate a direct communication message. The WTRU may trigger the direct communication message if it belongs to the set of the (pre-)configured/allowable zones. The WTRU may determine the set of zones and/or locations for initiating the direct communication message based on information (e.g., location information) received from another WTRU and/or sidelink relay. For example, the sidelink relay may receive a location of a source WTRU and/or a destination WTRU, and may determine whether to act as a relay for that source WTRU and/or destination WTRU based on a distance to the source WTRU and/or the destination WTRU. The sidelink relay WTRU may determine whether to transmit/relay the direct communication message based on the distance with the source/destination WTRUs. As another example, the WTRU may determine a pre-transmission behavior of a direct communication message based on one or more Uu measurements between the WTRU and the network. The WTRU may trigger one or more transmissions of direct communication if one or more RSRP measurements of the Uu interface satisfies (e.g., is smaller than) a threshold.

Upper Layer Information

The WTRU may receive information (explicitly or implicitly) from upper layers that might affect the transmission behavior of the direct communication. For example, the WTRU may receive an indicator (e.g., in the form of a value) that the WTRU may use to associate a direct communication with a transmission behavior. The indicator may be in the form of a priority, for example. Alternatively, the WTRU may receive a direct communication message on one of multiple LCHs and may associate a transmission behavior with each LCH. Alternatively, the WTRU may receive an indication of whether the direct communication is associated with an ongoing service or with a new service. The WTRU may determine the transmission behavior based on whether the direct communication is associated with an ongoing service or with a new service. The determined transmission behavior for an ongoing service may be different from the determined transmission behavior with a new service Alternatively, the WTRU may receive an indication of whether to enable "service continuity". The WTRU may determine the transmission behavior based on the presence and/or absence of this indication.

A WTRU may initiate a timer when it transmits a direct communication message or in connection with transmitting a direct communication message. Following expiration of the timer, the WTRU may perform (re)transmissions of the same TB or another TB carrying the direct communication message. The value of the timer may be configured based on various factors, such as the factors disclosed herein (e.g., the value for timer may be part of the transmission behavior).

A WTRU that transmits a direct communication message may be configured with one or more behaviors associated with processing of a response message received in response to the direct communication message. Such response message may be an upper layer message, AS layer message, a combination of an upper layer message and an AS layer message.

A WTRU may be (pre-)configured with a timer for use in connection with determining a feasibility of the response message. The WTRU may initiate the timer when a message (e.g., a direct communication message) is transmitted. If the WTRU does not receive a response message corresponding to (e.g., in response to) the message from a destination WTRU before the timer expires, the WTRU may determine that no destination WTRU reachable. Alternatively, if the WTRU receives a response from a destination WTRU before expiration of the timer, the WTRU may determine that the procedure to initiate the communication between the source and the destination WTRUs is successful and may begin a data transmission procedure among WTRUs. In various embodiments, the WTRU may perform various actions after successfully receiving one or multiple response message from a destination WTRU. The various actions may include any of informing upper layers and initiating a configuration of a bearer on the corresponding path.

The value (e.g., the initial value) of the timer may be determined based on any of the following: (i) a QoS of the service; (ii) availability of sidelink measurements (e.g., combined sidelink measurements) of a corresponding path (e.g., a current path); (iii) a number of hops in a corresponding path (e.g., a current path); and (iv) a CBR of the resource pool.

A WTRU may include in the message (e.g., direct communication message) timing information for an expected response ("expected response timing" and/or information about a delay budget ("delay budget information") of a message (e.g., a direct communication message). The expected response timing and/or the delay budget information may be provided to support/assist a WTRU and/or sidelink relay that receives the direct communication message in determining the processing behavior of the message, including, for example, as a factor in making a decision as whether to trigger and/or transmit a response message and/or make other transmission decisions.

A WTRU may initiate a timer and/or counter following reception of a direct communication message for use in connection with handling of sidelink measurements. The WTRU may increase the counter after each reception of a direct communication message and/or a transmission associated with the same source WTRU. The WTRU may perform various actions following expiration of the timer and/or the counter satisfying a threshold. The various actions may include any of reporting the sidelink measurements and/or information of the direct communication to upper layers; forwarding the direct communication message to another WTRU and/or sidelink relay; and discarding the sidelink measurement.

Representative Sidelink Measurement

A WTRU may perform sidelink measurements between itself and one or more other WTRUs and/or one or more sidelink relays. The sidelink measurements (e.g., a single sidelink measurement) may be measurements of (or based on) one or more parameters ("sidelink measurement parameters"). The sidelink measurement parameters may include any of: (i) a CQI; (ii) an RSRP; (iii) an RSRQ; (iv) a pathgain; (v) a pathloss; (vi) a distance between any of two WTRUs, a WTRU and a sidelink relay, two sidelink relays, a WTRU and a network element, and a sidelink relay and a network element; (vii) a reachability indicator (e.g., an indication of whether a WTRU, sidelink relay and/or network element is reachable or unreachable); (viii) a CBR of the resource pool configured to perform sidelink transmission; and (ix) a CR of the WTRU or sidelink relay.

As indicated, a WTRU may consider reachability as a sidelink measurement parameter. The WTRU may determine whether another WTRU, a sidelink relay and/or a network element is/are reachable (or not) based on a HARQ reception status. The WTRU may determine that another WTRU, a sidelink relay and/or a network element is/are not reachable if it does not receive a (pre-)configured number of expected HARQ feedback (DTX) from the corresponding WTRU, sidelink relay and/or network element consecutively. Alternatively, the WTRU may determine that another WTRU, a sidelink relay and/or a network element is/are reachable if it receives an ACK/NACK feedback from the corresponding WTRU, sidelink relay and/or network element.

A WTRU may indicate the presence of a message (e.g., a direct communication message) in an SCI and/or a medium access control (MAC) control element (CE). The indication may be used to support (e.g., as an impetus for) a WTRU, a sidelink relay, and/or network node to perform sidelink measurement (e.g., RSRP measurement) of the link corresponding to the message.

A WTRU may perform and/or maintain sidelink measurement associated with a message (e.g., a direct communication message), which may be distinguished by an L1 ID and an indicator in the SCI and/or the MAC CE. For example, following reception of a direct communication message, the WTRU may initiate measurement collection for a time period on all transmissions with the L1 ID and a message indicator in the SCI and/or the MAC CE. The WTRU may perform L3-RSRP measurement by averaging the RSRP measured in each transmission of the message. The filter coefficients may be determined based on any of the following: (i) (pre-)configured per resource pool; (ii) (pre-)configured per service; and (iii) (pre-)configured for one type of message (e.g., a direct communication message).

In various embodiments, the WTRU may be restricted to a fix (set) the transmission power of a message (e.g., a direct communication message) for each L1 ID. For example, the WTRU may be configured to transmit a direct communication message in a shared resource pool with data transmission. The WTRU be (pre-)configured to determine the transmission power based on CBR of the resource pool; sidelink pathloss; and/or downlink pathloss. However, if the direct communication request message is transmitted in the resource pool, the WTRU may determine to fix (set) the transmission power of the message regardless of CBR; sidelink pathloss; and/or downlink pathloss. The value of the transmission power may be (pre-)configured per service and/or destination ID. In various embodiments, the WTRU may implicitly and/or explicitly indicate the transmission power in the message (e.g., in a SCI and/or a MAC CE). For example, the transmission power may be implicitly indicated by another parameter indicated in the SCI (e.g., minimum communication range) of the transmission. The WTRU may determine the transmission power of the message based on the value of the field in the SCI and an associated mapping. The implicit and/or explicit indicating of the transmission power may be motivated to support a WTRU, a sidelink relay, and/or network node in sidelink measurement.

A WTRU may initiate a timer and/or counter following reception of a direct communication for use in connection with handling of sidelink measurements. The WTRU may increase the counter after each reception of a direct communication message or a transmission. The WTRU may perform various actions following expiration of the timer and/or the counter satisfying a threshold. The various actions may include any of reporting the sidelink measurement and/or information of the direct communication to upper layers; forwarding the direct communication message to another to another WTRU and/or sidelink relay, and discarding the sidelink measurement.

In various embodiments, a WTRU may use a measurement window and/or a number of direct communication message receptions (e.g., DIRECT_COMM_REQ message receptions) from a same sidelink relay (e.g., a source sidelink relay) to use for, or in connection with, determining the sidelink measurement associated with the sidelink relay (e.g., quality of the corresponding sidelink channel). The WTRU may obtain the measurement window and/or the number of direct communication message receptions in various ways. The WTRU, for example, may determine the measurement window and/or the number of direct communication message receptions based on various rules and/or information, including any of the following:

an L1 RSRP measurement of a single reception of a direct communication message and/or an accumulated RSRP measurement of a plurality of receptions of one or more direct communication messages. As an example, the WTRU may average the RSRP measurements of a first several direct communication messages (e.g., DIRECT_COMM_REQ messages) received and if the L3 RSRP measurement fails to satisfy (e.g., is greater than) a first threshold, then the WTRU may consider the sidelink relay as selectable and may stop performing measurements. If the L3 RSRP measurement fails to satisfy (e.g., is smaller than) a second threshold, then the WTRU may consider the sidelink relay as nonselectable and may stop performing measurements. Alternatively, if the L3 RSRP measurement satisfies both the first and the second thresholds, the WTRU may continue to monitor for subsequent direct communication messages from the sidelink relay and/or may perform measurements to determine whether the relay is selectable or not and/or whether to stop or continue performing measurements. This approach may be motivated to guarantee the selectable relay having a good sidelink channel.

a QoS of the relay service. The WTRU may select a short measurement window for low latency (e.g., high priority) relay services, for example. Alternatively, the WTRU may select a long measurement window for latency-tolerant relay service.

an availability of the sidelink relay. The WTRU may select a long measurement window if, for example, connectivity exists between the WTRU and another sidelink relay. Alternatively, the WTRU may select a short measurement window if, for example, the WTRU does not have connectivity to any sidelink relay.

a connection status with an existing sidelink relay. The WTRU may select a short measurement window if, for example, an AS failure with an existing (currently connected) sidelink relay has occurred or is occurring and/or the sidelink measurement associated with the existing sidelink relay fails to satisfy (e.g., falls below) a threshold.

a CBR of a resource pool.

a CR of the WTRU.

In various embodiments, the WTRU may obtain the measurement window and/or the number of direct communication message (e.g., DIRECT_COMM_REQ) receptions from one or more of the direct communication messages. For example, one, some or all of the direct communication messages may include information specifying, defining and/or for configuring the measurement window and/or the number of direct communication message receptions, and the WTRU may use some or all of the information ("window/receptions information") to determine and/or configure the measurement window and/or the number of direct communication message receptions. The window/receptions information may include, for example, one or more rules for the measurement window, one or more parameters for the measurement window, one or more values of one or more of such parameters, one or more values for the number of direct communication message receptions, etc. Alternatively, the window/receptions information may be, or include information (e.g., referential information) that may implicitly indicate the measurement window (e.g., rules, parameters, etc. therefor) and/or the number of direct communication message receptions. As an example, the window/receptions information (e.g., the information specifying, defining and/or for configuring the measurement window) may include an identifier (ID) of a relay service ("relay service ID"), which the WTRU may use to identify and/or obtain a measurement window (e.g., configured based on, or) for the corresponding relay service. The window/receptions information may be among, or provided along with, other information for facilitating the WTRU in performing the sidelink measurement. The window/receptions information and/or the other information may be populated into the direct communication message(s) by one or more other WTRUs (e.g., any of a sidelink relay and a source WTRU).

In various embodiments, the WTRU may be configured with one or more filter coefficient parameters to use in connection with determining an L3 RSRP of the sidelink. In various embodiments, the WTRU may use different filter coefficient parameters in connection with determining L3 RSRPs of the sidelink for different receptions of the same direct communication message. In various embodiments, each of the filter coefficient parameters may be associated with a single relay service. The WTRU may determine which filter coefficient parameter (of the one or more filter coefficient parameters) to use based on the targeted relay service. In various embodiments, one, some or all of the filter coefficient parameters may be associated with more than one relay service. The WTRU may determine which filter coefficient parameter to use based on the targeted relay service or based on the targeted relay service and other criteria. For example, the WTRU may determine, based on the targeted relay service, only one filter coefficient parameter (of the one or more filter coefficient parameters) is associated with the targeted relay service, and may use that one filter coefficient parameter. Alternatively, the WTRU may determine, based on the targeted relay service, a plurality of the filter coefficient parameters are associated with the targeted relay service, and may determine which one of the plurality of the filter coefficient parameters to use based on the other criteria. The other criteria may include a QoS of the relay service, for example.

One, some or all of the direct communication messages (e.g., DIRECT_COMM_REQ messages) may include information (e.g., one or more filter coefficient IEs) specifying, defining and/or for configuring the filter coefficient parameters. The information specifying, defining and/or for configuring the filter coefficient parameters may be among, or provided along with, other information for facilitating the WTRU in performing the sidelink measurement. The information specifying, defining and/or for configuring the filter coefficient parameters and/or the other information may be populated into the direct communication message(s) by one or more other WTRUs (e.g., any of a sidelink relay and a source WTRU).

In various embodiments, the WTRU may determine the sidelink measurement associated with a source of a direct communication message (e.g., DIRECT_COMM_REQ message) based on L1 RSRP measurements of a plurality of transmissions of the (same) direct communication message. As an example, the WTRU may perform L1 RSRP measurements of two or more transmissions (e.g., any of an initial transmission, and/one or more retransmissions) of a direct communication message (e.g., DIRECT_COMM_REQ message), and may determine the sidelink measurement associated with the source of the direct communication message based on the L1 RSRPs of the two or more transmissions the direct communication message, such as, for example, largest of the L1 RSRPs, the smallest of the L1 RSRPs, a weighted average L1 RSRPs, etc. The weights may be configured per relay service. This approach may be motivated to reduce the latency associated with the discovery procedure.

Representative Sidelink Measurement Forwarding and/or Reporting

Sidelink measurements may be reported/forwarded in various ways. The various ways may include any of an RRC message, a MAC CE, SCI (e.g., a 2nd SCI may be used to report the sidelink measurement) and an upper layer message (e.g., the AS layer may report the sidelink measurement to upper layer and the upper layer may include the measurement in one of the upper layer messages (e.g., a direct communication message)).

The WTRU may include any of the following information in the sidelink measurement: a CBR of the resource pool; a CR of the WTRU; a QoS of the service; an expected response timing; information about the delay budget of the packet; and a location of the WTRU.

A sidelink relay may forward sidelink measurements of one hop (e.g., the hop between the sidelink relay and a destination WTRU—"a second hop") to another node (e.g., a source WTRU and/or a gNB). The sidelink relay may combine sidelink measurements of multiple hops (e.g., two hops—a hop between source WTRU and a sidelink relay and a hop between the same or different sidelink relay and a destination WTRU) to report in the same message. Alternatively, the sidelink relay may report sidelink measurements per hop for one or more (e.g., each) of the hops separately. The sidelink measurements of one hop (e.g., the first hop, the second hop, etc.) and/or the combined sidelink measurement of multiple hops may be reported, forwarded, etc., periodically or based on various triggering events. The various triggering events may include any of the following:

- The sidelink measurements between the source WTRU and the sidelink relay (first hop) satisfies (e.g., is larger/smaller than) a threshold and/or the sidelink measurements of the second hop satisfies (e.g., is larger/smaller than) another threshold. The sidelink measurement thresholds may be determined based on the QoS of the service.
  - In one example, the sidelink relay may perform RSRP measurements of the first hop. The WTRU may be configured to perform RSRP measurement of the reverse link of the second hop. The WTRU may trigger forwarding of the RSRP measurement of the second hop if at least one of the two RSRP measurements satisfies (e.g., is smaller than) a RSRP threshold.
  - In another example, the WTRU may be configured to receive from the destination WTRU the RSRP sidelink measurement of the second hop. The WTRU may be configured to perform RSRP measurement of the first hop. The WTRU may trigger forwarding RSRP measurement of the second hop if at least one of the two RSRP measurements satisfies (e.g., is smaller than) a threshold.
- The sidelink of one hop (e.g., the second hop) becomes reachable/not reachable. For example, the sidelink relay may transmit an indication to the source WTRU to indicate that a reachability status of the second hop had changed (e.g., from reachable to unreachable or from unreachable to reachable).
- The sidelink relay receives an indication from another WTRU (e.g., a source WTRU or a destination WTRU) to report the sidelink measurements of the first hop and/or the second hop. For example, the sidelink relay may receive an indication in the SCI (e.g., the WTRU may use one bitfield in the first and/or the second SCI or one dedicated 2nd SCI format) and/or MAC CE to report the sidelink measurements of the second hop. Following reception of such indication, the sidelink relay may report the sidelink measurements to the source WTRU.
- The sidelink relay may receive sidelink measurements of one hop (e.g., the second hop). In one example, the sidelink relay may forward the sidelink measurements of the second hop whenever it receives a sidelink measurement report from the destination WTRU. In another example, the sidelink relay may forward the sidelink measurements of the second hop if the sidelink measurements satisfy (e.g., are smaller and/or larger than) one or more thresholds.
- The CBR of the resource pool satisfies (e.g., is greater and/or smaller than) a threshold and/or CR of the sidelink relay satisfies (e.g., is larger than) a threshold. For example, the sidelink relay may be (pre-)configured to forward the sidelink measurements of the second hop and/or to report the sidelink measurement of the first hop if the CBR of the resource pool satisfies (e.g., are smaller/larger than) a threshold and/or the CR of the sidelink relay satisfies (e.g., is larger than) a threshold.
- The transmission power of the sidelink relay and the WTRU in one hop (second hop) satisfies (e.g., is larger/smaller than) a threshold. For example, the sidelink relay may forward the sidelink measurements of the second hop if the transmission power of second hop satisfies (e.g., is larger/smaller than) a threshold. In one approach, the sidelink relay may trigger reporting of the sidelink measurements of the second hop to the source WTRU if its transmission power satisfies (e.g., is larger/smaller) than a threshold. In another approach, the sidelink relay may receive the transmission power information of the destination WTRU (e.g., via SCI of a transmission), and the sidelink relay may trigger reporting of the sidelink measurements of the second hop to the source WTRU if the indicated transmission power satisfies (e.g., is smaller/larger than) a threshold.
- The sidelink relay receives a request for sidelink measurements from another node (e.g., another WTRU or gNB). The triggering conditions to transmit request message may be (pre-)configured per resource pool or it may be configured via PC5 RRC. The request message may be conveyed via PC5 RRC.
- A WTRU (e.g., source WTRU) may receive a message (e.g., DIRECT_COMM_REQ message) from another node (e.g., another sidelink relay). By way of an example, the sidelink relay may receive a direct communication message (e.g., DIRECT_COMM_REQ message) transmission from another sidelink relay and an RSRP (or other sidelink measurement) of the direct communication message transmission may satisfy (e.g., is greater than) a threshold. The WTRU (e.g., source WTRU) may request reporting of the sidelink measurements (e.g., sidelink reference signal receive power (SL-RSRP) measurements) to evaluate a current link. The WTRU (e.g., source WTRU) may perform relay reselection if the sidelink measurement offset between the current link and the detected link satisfies (e.g., is greater than) a threshold.

A WTRU may trigger sidelink measurement reporting of one parameter based on the measurement of the same parameter or another parameter. The WTRU may trigger the sidelink measurement reporting of one parameter if the sidelink measurement of that parameter and/or another parameter satisfy (e.g., are larger/smaller than) respective thresholds. For example, a destination WTRU may trigger RSRP measurement reporting if a distance of the second hop satisfies (e.g., is larger/smaller than) a threshold. Alternatively, the WTRU may trigger distance reporting if the distance of the second hop satisfies (e.g., is larger/smaller than) a threshold.

A sidelink relay may trigger CSI-RS transmission to the source/destination WTRU(s) and/or may determine any properties associated with the CSI-RS transmissions/reporting based on various information. The various information may include any of the following:

- Other measurements: the sidelink measurement of the first hop and/or second hop satisfy (e.g., are smaller/larger than) respective thresholds.
- Distance: for example, if the distance of the first hop and/or the second hop satisfy (e.g., are smaller than) respective thresholds.
- CBR: for example, the CBR of the resource pool satisfies (e.g., is larger/smaller than) a threshold.

QoS of the relayed link and/or SLRBs being relayed: for example, the sidelink relay may configure a certain pattern of CSI-RS and/or trigger CSI-RS reports with a specific period. The period may depend (e.g., be based) on the QoS of the SLRBs and/or LCHs being relayed.

A measurement configuration for one link/hop may depend (e.g., be based) on the measurement values and/or a measurement configuration on another hop. For example, the configuration of measurements determined by one WTRU (e.g., CQI RS periodicity, RSRP reporting periodicity, etc.), where such measurements may be performed by that WTRU (e.g., CBR) or performed by a receiver WTRU (e.g., RSRP, CQI) may depend on a configuration aspect and/or value of another measurement (either the same type of measurement or a different type of measurement), where such other measurement is configured by another WTRU (e.g., the transmitter or receiver WTRU). Any of the measurements disclosed herein may be used (possible in combination) in such embodiment. A WTRU may determine the configuration of RSRP and/or CSI RS transmissions based on the value of the CQI measurements or RSRP measurements configured by another WTRU. Alternatively, a WTRU may determine the configuration of RSRP and/or CSI RS transmissions based on the configuration of same or other measurements by another WTRU. The WTRU may have an association of WTRUs which may trigger such dependency, whereby such association is based on the path of a relayed link (e.g., a sidelink relay may have an association for its measurements configured to a destination WTRU based with the measurements configured by a source WTRU when the sidelink relay is acting as a relay between the source and destination). In such embodiment, the measurement configuration may include any of the following: how often to perform a measurement and/or transmit a report; how often to transmit a reference signal; which event(s) may be configured and/or enabled for reporting a measurement; the parameters (e.g., thresholds, hysteresis, etc.) associated with a determination of an event triggering a reporting; etc.

As an example, a first WTRU (sidelink relay) may determine a periodicity of RSRP measurements to be reported by a second WTRU (destination WTRU) based on a periodicity of the RSRP measurements configured by a third WTRU (source WTRU) to be performed by the first WTRU. The first WTRU (sidelink relay) may use the same period as the period configured by the third WTRU (source WTRU) or may use a period which is a function of the period configured by the third WTRU (source WTRU).

As another example, a first WTRU (sidelink relay) may determine a periodicity of RSRP measurements to be reported by a second WTRU (destination WTRU) based on the measured value of the RSRP measurements configured by a third WTRU (source WTRU) to be performed by the first WTRU. The first WTRU (sidelink relay) may select a first periodicity if its own measurements of RSRP are below a threshold, and may select a second periodicity if the RSRP measurements are above a second threshold.

Representative Message Forwarding

A WTRU (e.g., a sidelink relay) may determine to forward a message (e.g., a direct communication message) and may perform forwarding of the message. Forwarding of the message may include any of the following:

The AS layer may report information about the reception of the message (e.g., a direct communication message) and associated sidelink measurements (e.g., RSRP measurement corresponding to the message) to upper layers.

The AS layer may indicate to upper layers the necessity of forwarding the message (e.g., a direct communication message) and/or that forwarding of the message is warranted.

The WTRU may prepare another message (e.g., another direct communication message) corresponding to the received message (e.g., the received direct communication message), which may include any of the following:

modifying the source information of the message (e.g., adding the relay ID information); and adding any of the following information:

sidelink measurements (e.g., the sidelink measurement of the first hop between itself and the source WTRU and/or Uu RSRP);

a CBR of the resource pool and/or the CR of the sidelink relay;

a QoS of the service (which may include, e.g., one or more SLRB configurations, one or more resource pool configurations, one or more supported priorities, one or more supported latencies, one or more supported data rates, etc.);

expected response timing and/or information about the delay budget of the packet;

a location of the WTRU;

an indication of a load of the WTRU (which may include, e.g., buffer status information, a number of connected UEs, etc.);

an RRC status of the WTRU (e.g., connected, idle, inactive);

any of one or more IDs (e.g., UE IDs) associated with one or more WTRUs requesting for a relay service (e.g., source and/or destination WTRUs);

one or more RSRPs associated with the one or more WTRUs requesting for a relay service (or one or more IDs (e.g., UE IDs) associated with such WTRUs);

resource pool configuration/information used for data communication, which may include, e.g., any of the following:

a HARQ resource configuration and/or indication thereof; and one or more resources used for communication and/or indication thereof and one or more capabilities of the sidelink relay and/or one or more remote WTRUs, which may include, e.g., any of the following:

a transmission power level;

a MIMO capability;

a sensing capability of the sidelink relay and/or the one or more remote WTRUs (e.g. partial sensing, no sensing, and full sensing);

one or more supported MCSs or an indication thereof (e.g., an indication of a MCS table that can be supported); and one or more supported carriers or an indication thereof The WTRU may trigger transmission(s) of the message (e.g., a direct communication message).

The WTRU may forward a message (e.g., a direct communication message) based on any of the following: (i) a received signal strength of the message (e.g., a direct communication message); (ii) measurements configured for the message, e, g, as disclosed herein; (iii) a distance between the sidelink relay WTRU and a source WTRU and/or a distance between the sidelink relay WTRU and a destination WTRU; (iv) QoS requirements of the services; (v) a location of the WTRU; (vi) a CBR of the resource pool and/or a CR of the sidelink relay; (vii) speed of the WTRU; (viii) a number of relayed links and/or SLRBs currently established at the WTRU; and (ix) previous reception of other related direct communication messages associated with the same relay reselection event (e.g., a sidelink relay or a destination WTRU may forward up to N direct communication messages associated with the same source WTRU (where N could be 1). After forwarding N direct communication request message, the WTRU may drop any other direct communication if they are associated with the same relay reselection event).

A WTRU may determine to forward a message (e.g., a direct communication) from the source WTRU and decide to be a relay of the source WTRU based on the sidelink measurement between the WTRU and the source WTRU and/or the sidelink measurement between the WTRU and the destination WTRU (e.g., the RSRP measurement of the message). For example, the WTRU may forward the message (e.g., a direct communication message) from the source WTRU if the sidelink measurement is within a (pre-)configured range.

As an example, the WTRU may forward the message (e.g., a direct communication message) if the RSRP measured in the message is greater than one threshold and/or smaller than another threshold. Alternatively, the WTRU may forward the message if the sidelink pathloss between the source and the relay WTRUs is smaller than one threshold and/or larger than another threshold.

As another example, the WTRU may forward the message (e.g., a direct communication message) if the RSRP or sidelink pathloss between the WTRU and the destination WTRU is smaller than one threshold and/or greater than another threshold. The destination WTRU may be indicated in direct communication and RSRP or SL pathloss between the WTRU and the destination WTRU may be obtained from the existing unicast link between the relay WTRU and the destination WTRU.

A WTRU may determine to forward a message (e.g., a direct communication message) from the source WTRU based on the distance between the WTRU and the source WTRU and/or the distance between the WTRU and the destination WTRU. For example, the WTRU may relay the message if the distance between the WTRU and the source WTRU and/or the distance between the WTRU and the destination WTRU is larger than one (pre-)configured threshold and/or smaller than another (pre-)configured threshold. These thresholds may be determined based on the minimum communication range associated with the service.

A WTRU may determine to forward a message (e.g., a direct communication message) based on the QoS requirements of the service. For example, the WTRU may determine to relay the message based on any of various QoS parameters. The various QoS parameters may include any of: (i) priority, latency, reliability, and/or data rate associated with the service; and (ii) a minimum communication range associated with the service.

The QoS parameters associated with the service may be implicitly indicated in the message. Each QoS parameters associated with the service may be determined based on smallest/largest value(s) of the data associated with the service. The WTRU may be (pre-) configured with a set of services, any (e.g., each) of which may be associated with a set of QoS parameters. The WTRU may determine the QoS parameters corresponding to the service indicated in the message (e.g., a direct communication message).

A WTRU may determine to forward the message (e.g., a direct communication message) based on any of a priority, latency, and/or reliability of the service. For example, the WTRU may first decide whether it can satisfy the required QoS (e.g., priority, latency, reliability, and data rate) requested by the source WTRU, which may be indicated in the message. The WTRU may forward the message if it can satisfy the required QoS of the source WTRU.

A WTRU may determine to forward a message (e.g., a direct communication message) based on a required communication range. For example, the WTRU may determine to forward the message if the required communication range of the service is larger than a threshold and/or the distance between the WTRU and the source WTRU is smaller than a function of the minimum communication range.

A WTRU may determine to forward a message (e.g., a direct communication message) based on the location of the WTRU. For example, the WTRU may be (pre-)configured with a set of zones to initiate the relay functionality. The WTRU may forward the message if its zone ID belongs to the set of the allowed zones.

The WTRU may determine the allowed zones based on a function of its WTRU ID (provided by upper layers), so that upper layers can control which WTRUs can act as relays. This approach may be motivated to restrict the number of relays in a specific area.

As an example, the WTRU may receive the location/zone associated with the source WTRU and determine whether to forward the direct communication message based on its own location and the location/zone of the source WTRU. The WTRU, for instance, may receive the location/zone of the source WTRU in the direct communication message or another AS message transmitted before/during/after the direct communication message. The sidelink relay may be configured with a rule based on the distance between the source WTRU and destination WTRU and/or the location of the relay WTRU, as to whether to relay the direct communication message. For example, the relay WTRU may forward the message if any of the following are met: (i) a distance between the source WTRU and the relay WTRU (e.g., determined based on zone IDs) satisfies (e.g., is below) a threshold; (ii) a distance between the source WTRU and the sidelink relay WTRU (e.g., determined based on zone IDs) satisfies (e.g., is above) a threshold; and (iii) the sidelink relay is configured to be a relay in the specific zone it is located in (e.g., the sidelink relay may be configured with a list of zones in which it is allowed to forward the message, and the sidelink relay may forward the message if it is currently located in one of those zones).

A WTRU may determine to forward a message (e.g., a direct communication message) based on the CBR of the resource pool and/or CR of the sidelink relay. For example, the WTRU may determine to forward the message if the CBR of the resource pool is smaller than a threshold and/or CR of the relay is smaller than a threshold. The CR and/or CBR threshold may be (pre-) configured per service.

A WTRU may determine to forward a message (e.g., a direct communication message) based on the speed of the WTRU or relative speed between the WTRU and the source WTRU. For example, the WTRU may be (pre-)configured with a maximum speed threshold to determine whether it is able to relay the message or not. If the WTRU speed is smaller than the threshold, the WTRU may forward the message; otherwise, it is not allowed to forward the message. The speed threshold may be (pre-)configured for each service based on the QoS requirements of the service.

Representative Relay/Path (Re)Selection

A WTRU may perform path selection. Performing path selection may include selecting an appropriate path (e.g., a specific sidelink relay, direct path, etc.). Selecting the appropriate path may be based on reception of multiple direct communication messages originating from the same source WTRU (for example). The WTRU may perform path selection by doing any of the following: (i) transmitting a response message and (ii) informing upper layers of the selected path. The response message may indicate (e.g., include information specifying) a selected path. The response message may be transmitted to the indicated/specified path only (e.g., the sidelink relay(s) associated with the selected path).

The WTRU may perform path selection following reception of a direct communication message based on any of the following: (i) a number of hops; (ii) sidelink measurements, e.g., combined sidelink measurement of multiple hops; (iii) QoS of the service; (iv) reception timing of the direct communication message; (v) resource pool information; (vi) a distance between the WTRU and a sidelink relay; and (vii) one or more capabilities of the sidelink relay.

In various embodiments, the WTRU may perform path selection based on the QoS of the service. By way of example, for each service, which may have one or more associated QoS profiles, the WTRU may be (pre-)configured with any of the following: (i) a combined sidelink measurement of multiple hops that is required; (ii) a maximum number of hops; and (iii) a reception time of the direct communication message.

The WTRU may determine the path(s) satisfying the QoS requirement of the service. If there are multiple paths satisfying the QoS requirements, the WTRU may further select the path based on other criteria.

A WTRU may prioritize the path with a smaller number of hops. For example, the WTRU may prioritize a path having smaller number of hops if other criteria are satisfied. The other criteria may include any of the following: (i) a sidelink measurement in each hop of the path is larger than a threshold; and (ii) a distance in each hop of the path is smaller than a threshold.

Figure 4:
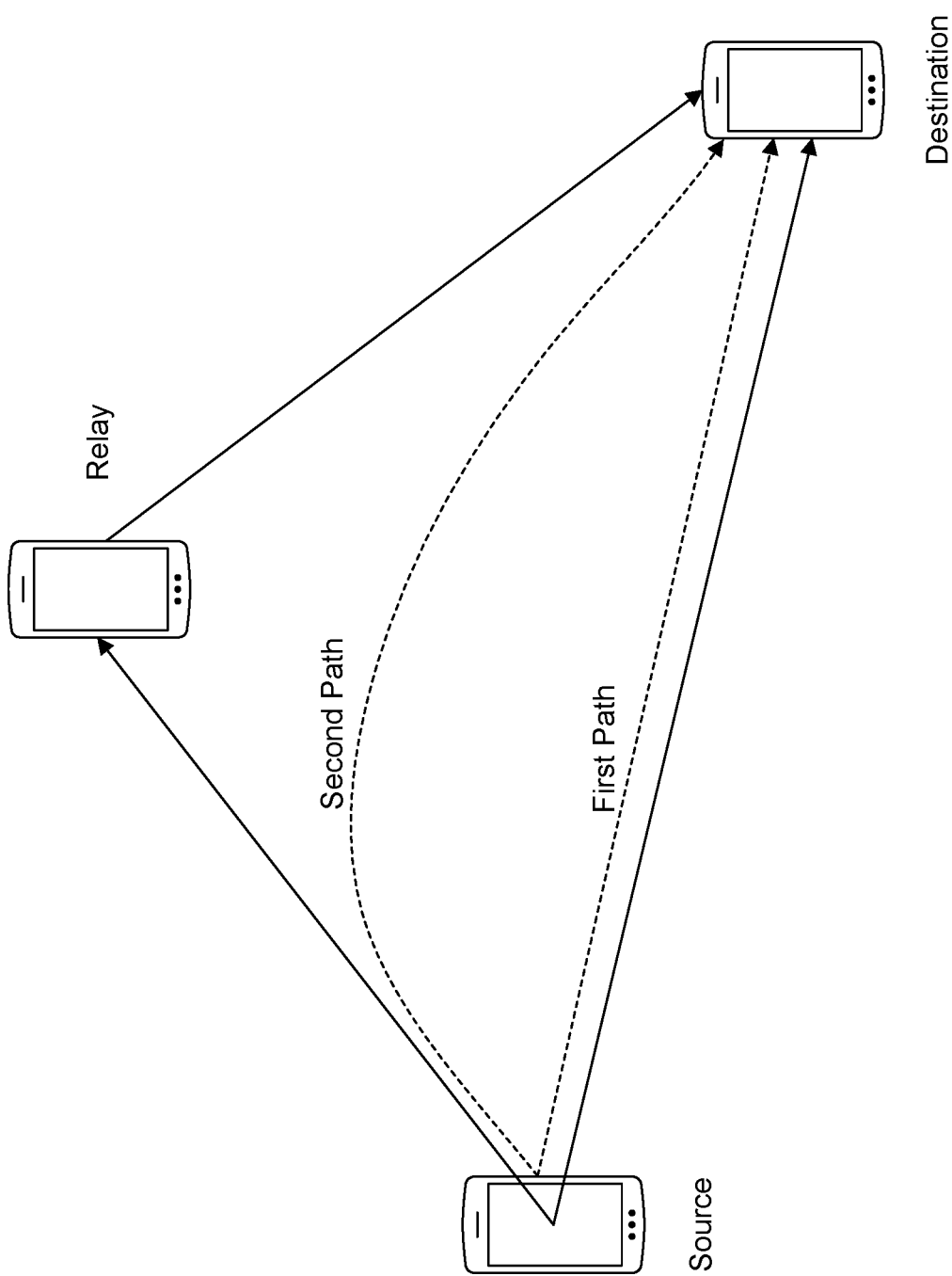
FIG. 4 illustrates an example path selection procedure.

For example, as illustrated in FIG. 4, a destination WTRU has two paths between a source WTRU and the destination WTRU from which to select. The first path is a direct link (i.e., a single hop) between the source and the destination WTRUs. The second path is via a relay WTRU (e.g., two hops). The WTRU prioritizes the direct link path if the sidelink measurements between the source and destination WTRUs are satisfied (e.g., are larger than) a threshold.

The WTRU may prioritize one path over another based on combined sidelink measurements of a plurality of hops in a path. For example, the WTRU may prioritize the path having the lowest/highest value combined sidelink measurements of the hops in the path. The WTRU may be (pre-)configured with various functions for performing path selection based on the combined sidelink measurements and may use any of the various functions to carry out path selection. The function may be the weighted total sidelink measurement in each hop. For example, the WTRU may select the path having the maximum weighted total sidelink measurement. Alternatively, and/or additionally, the function may be the minimum sidelink measurement among all hops in the path. For example, the WTRU may select the path having the maximum value of the minimum sidelink measurement.

In another approach, the WTRU may prioritize the path with the highest sidelink measurement of a specific hop given the sidelink measurement of each other hop is greater than a (pre-)configured threshold. The specific hop to consider may be the last hop, the first hop, or any hop between the first and the last hop. For example, for path selection of two hops, the destination WTRU may select the path having the highest sidelink measurement in the second hop (the hop from the relay to destination WTRU) given the RSRP of the first hop is greater than a threshold.

The WTRU may receive the direct communication message from multiple paths. The WTRU may select the path based on a reception time of the direct communication message. For example, the WTRU may determine to select first path it receives the message satisfying the QoS requirement.

In various embodiments, the WTRU may select the path based, at least in part, on information about a resource pool of a sidelink relay. The sidelink relay may indicate the resource pool information corresponding to a resource pool configured and/or used for data communication in the direct communication message. The resource pool information may include, e.g. availability of HARQ resource(s), a CBR of the resource pool, etc. The WTRU may receive the direct communication message and may use some or all of the resource pool information in connection with determining and/or selecting a path. The WTRU may prioritize the sidelink relay based on the resource pool information, for example, and may select the sidelink relay if, for example, the sidelink relay is assigned the highest priority (and/or satisfies other criteria). The WTRU may assign to the sidelink relay a higher priority than other sidelink relays if, for example, the resource pools of the other sidelink relays do not support HARQ transmission and the resource pool information indicates that the resource pool supports HARQ transmissions. Alternatively, the WTRU may assign to the sidelink relay a higher priority than other sidelink relays if, for example, the resource pools of the other sidelink relays have higher CBRs than a CBR of the resource pool information indicated by the resource pool information. The WTRU may assign to the sidelink relay a priority based on a combination of information indicated by the resource pool information. In various embodiments, the WTRU may not exclude the sidelink relay (e.g., maintain as a candidate) if the data resource pool of the sidelink relay is greater than a threshold. The threshold may be configured per relay service.

In various embodiments, the WTRU may select the path based, at least in part, on a distance between the sidelink relay and the WTRU. The WTRU may prioritize the sidelink relay based on the distance between the sidelink relay and the WTRU, for example, and may select the sidelink relay if, for example, the sidelink relay is assigned the highest priority (and/or satisfies other criteria). The WTRU may assign to the sidelink relay a higher priority than other sidelink relays if, for example, the sidelink relay is closer to the WTRU than the other sidelink relays. In various embodiments, the WTRU may exclude the sidelink relay from being a candidate if, for example, the distance to between the sidelink relay and the WTRU is greater than a threshold. The threshold may be configured per relay service.

In various embodiments, the WTRU may select the path based, at least in part, on one or more capabilities of the sidelink relay. The WTRU may prioritize the sidelink relay based on the capabilities of the sidelink relay, for example, and may select the sidelink relay if, for example, the sidelink relay is assigned the highest priority (and/or satisfies other criteria). The WTRU may assign to the sidelink relay a higher priority than other sidelink relays if, for example, the sidelink relay supports a transmission power greater than transmission powers supported by the other sidelink relays. Alternatively, the WTRU may assign to the sidelink relay a higher priority than other sidelink relays if, for example, the sidelink relay supports a full sensing capability and the other sidelink relays support partial or no sensing capabilities.

The WTRU may maintain a timer to receive multiple transmissions of a message (e.g., a direct communication message). The WTRU may be configured with a timer to perform path selection. The initial value of the timer may be conveyed to the WTRU via the direct communication message. Alternatively, the initial value of the timer may be determined based on any combination of the following: (i) a (pre-)configured value per service; and (ii) a CBR of the resource pool.

The WTRU may initiate a timer after reception of the first direct communication message. Following expiry of the timer, the WTRU may perform any of the following: (i) perform relay selection and response to the direct communication message; and (ii) report the information about the detected path to upper layers.

The AS layer of the WTRU may report the path to the upper layers to support the upper layer in path selection and/or response to a direct communication message. The information may include one or more of the following: (i) a source ID; (ii) the set of relay IDs; (iii) sidelink measurements for each hop; and (iv) associated QoS of the service.

The WTRU (e.g., the AS layer thereof) may select a set of paths to report to upper layers. In one approach, the WTRU may report the selected paths to upper layers, or it may report all detected paths to upper layers. Alternatively, the WTRU may report a (pre-)defined number of paths to the upper layers. The WTRU may eliminate one or more paths as candidates for reporting. The WTRU may eliminate a path as a candidate for reporting based on a combined sidelink measurement of multiple hops in the path. For example, the WTRU may eliminate the path if sidelink measurement of multiple hops in the path is smaller or larger than a threshold. The WTRU may eliminate a path as a candidate for reporting based on a number of successful receptions in one path. For example, the WTRU may perform reception of direct communication corresponding to one path. The WTRU may eliminate the path if the number of TBs and/or messages received from the path is smaller than a threshold. The WTRU may eliminate one or more paths as candidates for reporting based on any of a QoS of the service and a CBR of the resource pool and/or CR of the WTRU. The WTRU may eliminate a path as a candidate for reporting based on a number of hops in the path. For example, the WTRU may eliminate a path having a number of hops larger than a threshold. The threshold may be determined based on the QoS of the service and/or CBR of the resource pool and/or CR of the WTRU.

A WTRU may perform path (re)selection based on any of the following:

Combined sidelink measurements of a current path. The combined sidelink measurement of a current path may be determined based on any of the following: (i) sidelink measurements determined using measurements of data transmissions in the path; and (ii) sidelink measurements determined using measurements of a specific message (e.g., a direct communication message).

Combined sidelink measurements of a new path. The combined sidelink measurements of a new path may be obtained based on sidelink measurements of a specific message (e.g., a direct communication message).

The number of hops of each path.

QoS of the service.

As an example, the WTRU may perform path selection if the combined sidelink measurement of the current path is smaller/larger than a threshold. The threshold may be (pre-)configured based on the QoS of the service.

As another example, the WTRU may reselect a new path if the sidelink measurement of the new path satisfying the QoS of the service (e.g., combined RSRP is smaller than a threshold) and the number of hops in the new path is smaller than the number of hops in the current path.

As another example, the WTRU may reselect a new path if the combined sidelink measurement of the new path is larger than a threshold and/or the combined sidelink measurement of the current path is smaller than a threshold and/or the difference between sidelink measurement of the current path and the new path is larger/smaller than a delta threshold. The delta threshold may be determined based on the number of hops in each path and/or the QoS of the service.

In various embodiments, a WTRU (e.g., the source WTRU) may determine a sidelink measurement of a path. The WTRU may determine the sidelink measurement of a path, for example, based on one or more sidelink measurements of some or all hops of the path. For example, in various embodiments, the WTRU may determine that the sidelink measurement of a path may be a sidelink RSRP ("SL-RSRP") or an accumulated SL-RSRP of the first hop. In various embodiments, the WTRU may determine that the sidelink measurement of a path may be an SL-RSRP or an accumulated SL-RSRP of the second hop. In various embodiments, the WTRU may determine that the sidelink measurement of a path may be a combination of SL-RSRPs of a plurality of the hops ("combined SL-RSRP"), such as, e.g., any of a maximum and/or minimum of an SL-RSRP of each of the plurality of the hops. For example, the sidelink measurement of a path may not include the sidelink measurements of all of the hops thereof because the WTRU does not possess sidelink measurements associated with one or more of the hops and/or a decision is made to not use sidelink measurements associated with one or more of the hops.

Figure 5:
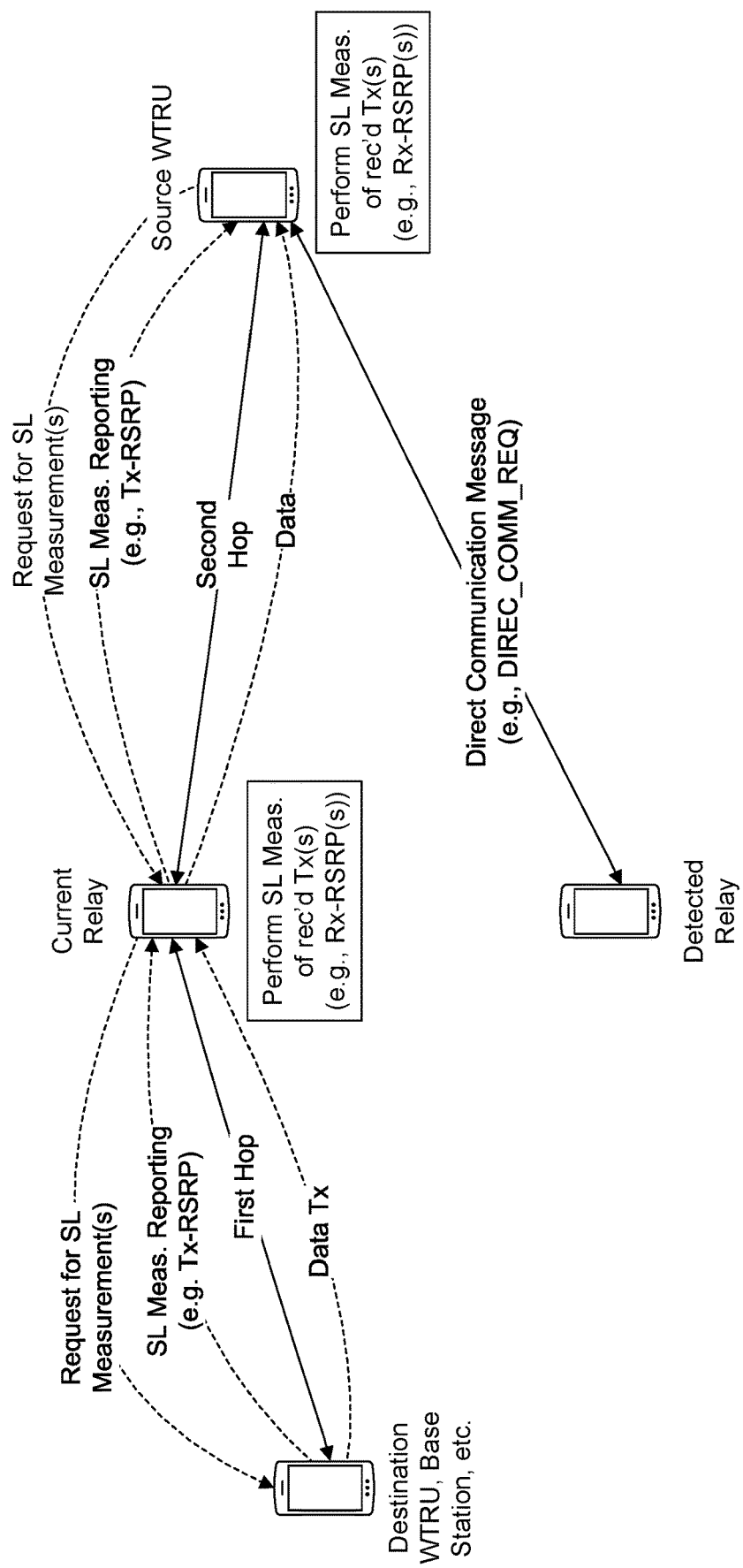
FIG. 5 illustrates examples of sidelink measurements associated with a path.

FIG. 5 illustrates examples of sidelink measurements associated with a path, including a plurality of hops. As shown, the sidelink measurement of any of hop of a path may be (i) a sidelink measurement of a transmission received by a sidelink relay, a WTRU (e.g., a source WTRU), a base station, etc. ("Rx SL measurement"), (ii) an accumulation or other combination of a plurality of Rx SL measurements ("accumulated Rx SL measurement"), (iii) a reported/forwarded sidelink measurement of a transmission transmitted by a sidelink relay, a WTRU (e.g., a source WTRU), a base station, etc. ("Tx SL measurement"), and/or (iv) a reported/forwarded accumulation or other combination of a plurality of Tx SL measurements ("accumulated Tx SL measurement"). For simplicity of exposition, the terms "Rx SL measurement" and "accumulated Rx SL measurements" may be referred to herein collectively as "Rx SL measurement," and the terms "Tx SL measurements" and "accumulated Tx SL measurements" may be referred to herein collectively as "Tx SL measurement."

The Rx SL measurement may include any of a sidelink measurement of a data transmission and a sidelink measurement of a discovery transmission. The Tx SL measurement may include any of a sidelink measurement of a data transmission and a sidelink measurement of a discovery transmission. A sidelink measurement (e.g., RSRP measurement) of a discovery transmission may be referred to as a sidelink discovery transmission measurement (e.g., SD-RSRP measurement).

A sidelink relay and/or a WTRU (e.g., a source WTRU) may determine the sidelink measurement (e.g., SL-RSRP measurement) of a hop using or based on any of the following: (i) one or more Rx SL measurements (e.g., the Rx-RSRP measurements) of one or more sidelink transmissions received at the WTRU; (ii) one or more Tx SL measurements (e.g., the Tx-RSRP measurements) reported/forwarded to the sidelink relay and/or the WTRU; (iii) one or more sidelink measurements of one or more data transmissions in the hop; and (iv) one or more sidelink measurements of one or more specific messages (e.g., one or more DIRECT_COMM_REQ message) transmissions in the hop.

In various embodiments, the sidelink relay and/or the WTRU may determine the SL-RSRP of a hop as a function of any of Tx-RSRP measurement and Rx-RSRP measurement. The sidelink relay and/or the WTRU may determine the SL-RSRP of a hop, e.g., as any of a maximum of the Tx-RSRP measurement and Rx-RSRP measurement, a minimum of the Tx-RSRP measurement and the Rx-RSRP measurement, the average of the Tx-RSRP measurement and the Rx-RSRP measurement, one of the Tx-RSRP measurement and the Rx-RSRP measurement, etc. In some scenarios, for example, when SL-RSRP measurement reporting is enabled, the sidelink relay and/or the WTRU may determine that the SL-RSRP of the hop may be the Tx-RSRP measurement. In some other scenarios, for example, when SL-RSRP measurement reporting is disabled, the sidelink relay and/or the WTRU may determine that the SL-RSRP of the hop may be the Rx-RSRP measurement. And in other scenarios, the sidelink relay and/or the WTRU may determine that the SL-RSRP of the hop may be the maximum/minimum of Tx-RSRP measurement and Rx-RSRP measurement.

In various embodiments, the sidelink relay and/or the WTRU may determine of the sidelink measurement (e.g., SL-RSRP measurement) of a hop as a function of the sidelink measurements of the data transmissions and/or the sidelink measurements (e.g., SL-RSRP measurement) of one or more direct communication message (e.g., DIRECT_COMM_REQ message) transmissions. The sidelink relay and/or the WTRU may determine the SL-RSRP of a hop, e.g., as any of a maximum of the sidelink measurements of the data transmissions and the sidelink measurements of the direct communication message transmissions, a minimum of the sidelink measurements of the data transmissions and the sidelink measurements of the direct communication message transmissions, a weighted average of the sidelink measurements of the data transmissions and the sidelink measurements of the direct communication message transmissions, one of the sidelink measurements of the data transmissions and the sidelink measurements of the direct communication message transmissions, etc.). In some scenarios, the sidelink relay and/or the WTRU may determine that the sidelink measurement (e.g., SL-RSRP measurement) of the hop may be the sidelink measurement (e.g., SL-RSRP measurement) of the direct communication message (e.g., DIRECT_COMM_REQ message) transmissions. In some other scenarios, the sidelink relay and/or the WTRU may determine that the sidelink measurement (e.g., SL-RSRP measurement) of the hop may be the sidelink measurements (e.g., SL-RSRP measurements) of the data transmissions. And in other scenarios, the sidelink relay and/or the WTRU may determine that the sidelink measurement (e.g., the SL-RSRP measurement) of the hop may be the maximum/minimum of the sidelink measurements (e.g., SL-RSRP measurements) of the data transmission and the sidelink measurements (e.g., SL-RSRP measurements of the direct communication message (e.g., DIRECT_COMM_REQ message) transmissions.

A WTRU may determine a type of transmission ("transmission type") to use for sidelink measurement of a hop. The transmission types may include sidelink data transmission and/or a discovery transmission. In various embodiments, the WTRU may determine the transmission type (e.g., a sidelink data transmission and/or a discovery transmission) and/or one or more sidelink measurement parameters (e.g., a SD-RSRP measured from a discovery transmission or an SL-RSRP measured from data transmission) for evaluation of a sidelink channel between the WTRU and another WTRU (e.g., a sidelink channel between the source WTRU and a sidelink relay). The WTRU may determine the sidelink transmission type (e.g., a sidelink data transmission and/or a discovery transmission) based any of the following: (i) a network indication, (ii) an availability of sidelink data and/or discovery transmission, (iii) an RRC state of the WTRU, (iv) SL-DRX status of the WTRU, and (v) a Uu-DRX status of the WTRU. For example, the WTRU may be (pre-) configured by a network with, and/or receive, from the network, information indicating (e.g., an indicator of) a transmission type to use to evaluate a sidelink channel. The WTRU may evaluate the sidelink channel using the indicated/(pre-)configured transmission type. As another example, the WTRU may use a sidelink data transmission to evaluate the sidelink channel if sidelink data (and/or the sidelink data transmission) is available, and may use a sidelink discovery transmission if sidelink data (and/or a sidelink data transmission) is not available. The WTRU may consider (e.g., declare that) the sidelink channel is not reachable if sidelink data and/or a sidelink data transmission and discovery information and/or a discovery transmission are not available. As another example, the WTRU may use a discovery transmission to evaluate sidelink channel if the WTRU is in an RRC idle state or an RRC inactive state. The WTRU may use any of a sidelink data transmission and a discovery transmission to evaluate the sidelink channel if the WTRU is in an RRC connected state. As another example, the WTRU may determine a transmission type to use to evaluate the sidelink channel based on the SL-DRX status of the WTRU. The WTRU, for example, may use a discovery transmission to evaluate a sidelink channel with a peer UE if a SL-DRX is (pre-)configured. Alternatively, the WTRU may use sidelink data to evaluate the sidelink channel if a SL-DRX is not (pre-)configured. Alternatively, the WTRU may use a discovery transmission to evaluate the sidelink channel if the WTRU is in an SL-DRX off duration, and may use sidelink data to evaluate the sidelink channel. if the UE is in an SL-DRX on duration.

As another example, the WTRU may use a discovery transmission to evaluate a sidelink channel with a peer UE if a Uu-DRX is (pre-)configured. Alternatively, the WTRU may use sidelink data to evaluate the sidelink channel if a Uu-DRX is not (pre-)configured. Alternatively, the WTRU may use a discovery transmission to evaluate the sidelink channel if the WTRU is in an Uu-DRX off duration, and may use sidelink data to evaluate the sidelink channel if the UE is in an Uu-DRX on duration.

In various embodiments, a WTRU may determine any of an availability of sidelink data and an availability of discovery data. The WTRU may determine the availability of sidelink data for a sidelink channel based on any of the following: (i) an RRC state of the WTRU, (ii) an availability of the data within a sliding window, (iii) an SL-DRX status and (iv) an Uu-DRX status. For example, the WTRU may determine that sidelink data is available if a SL-DRX is not (pre-) configured. Alternatively, the WTRU may determine that sidelink data is either available or unavailable if a SL-DRX is (pre-)configured. The UE, for example, may determine that sidelink data is available if the UE is in a SL-DRX on duration. As another example, the WTRU may determine that sidelink data is available if a Uu-DRX is not (pre-)configured. Alternatively, the WTRU may determine that sidelink data is either available or unavailable if a Uu-DRX is (pre-) configured. The UE, for example, may determine that sidelink data is available if the UE is in a Uu-DRX on duration.

In various embodiments, the WTRU may be (pre-)configured with conditions for determining whether sidelink data and/or discovery data is available (and/or not available). The WTRU, for example, may be (pre-)configured with information to form a sliding window, and may form the sliding window using such information. If the WTRU has not received sidelink data or an amount of the sidelink data received from another WTRU is smaller than a (pre-)configured threshold, then the WTRU may consider that it does not have sidelink data. The size of the sliding window and/or the threshold for the sidelink data may be configured from the network or (pre-) configured.

In various embodiments, the WTRU may be (pre-)configured with information to form a sliding window and/or a data threshold to determine whether sidelink data is available. The WTRU may use the (pre-)configured parameters to determine the availability of sidelink data if, for example, the WTRU is in RRC connected mode. The WTRU may be configured to not use the (pre-)configured parameters (e.g., sliding window and data threshold) if the WTRU is in RRC idle mode and/or RRC inactive mode, and may determine that sidelink data is not available if it is in RRC idle mode or RRC inactive mode.

A sidelink relay and/or a WTRU (e.g., a source WTRU) may determine which of one or more sidelink measurements (e.g., sidelink measurements of a data transmission, sidelink measurements of a discovery transmission, Tx SL measurement, Rx SL measurement, etc.) to use in connection with determining the sidelink measurement of a hop. The sidelink relay and/or the WTRU may determine which of the sidelink measurements to use in connection with determining the sidelink measurement of a hop, for example, based on any of the following:

(Pre-)configuration.
   In various embodiments, the sidelink relay and/or a WTRU may be (pre-) configured to use one of the sidelink measurements (e.g., Tx SL measurement or Rx SL measurement) in connection with determining the sidelink measurement of a hop (e.g., based on any of one or more data/discovery transmissions). The sidelink relay and/or a WTRU may transmit/receive a transmission including information for configuring the sidelink measurements (e.g., Tx SL measurement or Rx SL measurement) to use. The sidelink relay and/or a WTRU may receive/transmit the transmission using one or more of various protocols, including RRC protocols, for example using PC5-RRC and/or Uu RRC protocols.

In various embodiments, the sidelink measurements (e.g., Tx SL measurement or Rx SL measurement) to use may be (pre-)configured per resource pool.
   In various embodiments, the sidelink relay and/or a WTRU may be (pre-)configured with one or more indications of, or rules for determining, which of the sidelink measurements (e.g., Tx SL measurement or Rx SL measurement) may have precedence over another. As an example, the sidelink relay and/or the WTRU may use Tx SL measurement if it is available; otherwise, the sidelink relay and/or the WTRU may use Rx SL measurement. As another example, the sidelink relay and/or the WTRU may use a sidelink discovery transmission measurement (e.g., SD-RSRP measurement) if it is available, otherwise the sidelink relay and/or the WTRU may use a sidelink measurement of data transmission (e.g., a Tx SL measurement of a data transmission, an Rx SL measurement of a data transmission or a combination of Tx SL measurement and an Rx SL measurement of a data transmission). As another example, the sidelink relay and/or the WTRU may be configured to enable/disable sidelink measurement reporting. The sidelink relay and/or the WTRU may use a Tx SL measurement (e.g., a Tx-RSRP measurement) if sidelink measurement reporting is enabled; otherwise, sidelink relay and/or the WTRU may use an Rx SL measurement (e.g., an Rx-RSRP measurement) or a combination of a Tx SL measurement and an Rx SL measurement. As another example, the sidelink relay and/or the WTRU may be configured to enable/disable discovery message transmissions/monitoring. The sidelink relay and/or the WTRU may use measurements from discovery message if discovery message transmission/monitoring is enabled.

The frequency of transmissions during a time period.
   As an example, the sidelink relay and/or the WTRU may determine which of the sidelink measurements (e.g., Tx SL measurement and/or Rx SL measurement) to use based on the number of transmissions transmitted therefrom and/or received thereby within a period of time. The sidelink relay and/or the WTRU may use the sidelink measurements (e.g., Tx SL measurement and/or Rx SL measurement) of the direction corresponding to the most frequent transmissions. The sidelink relay and/or the WTRU may determine which of the sidelink measurements (e.g., Tx SL measurement and/or Rx SL measurement) to use, for example, based on whether the number of transmissions transmitted within a period of time is greater than the number of receptions within the same period of time (and/or vice versa).
   As an example, the sidelink relay and/or the WTRU may use a Tx SL measurement (e.g., Tx-RSRP measurement) if the number of transmissions transmitted thereby within a window satisfies (e.g., is greater than or equal to) a threshold and/or if the number of transmissions received thereby within the window fails to satisfy (e.g., is less than) a threshold.
   As an example, the sidelink relay and/or the WTRU may use an Rx SL measurement (e.g., Rx-RSRP measurement) if the number of transmissions received thereby within a window satisfies (e.g., is greater than or equal to) a threshold and/or if the number of transmissions transmitted thereby within the window fails to satisfy (e.g., is less than) a threshold.

As an example, the sidelink relay and/or the WTRU may use a Tx SL measurement (e.g., Tx-RSRP measurement) if the number of transmissions transmitted thereby within a window satisfies (e.g., is greater than or equal to) a threshold, and use an Rx SL measurement otherwise.

As an example, the sidelink relay and/or the WTRU may use an Rx SL measurement (e.g., Rx-RSRP measurement) if the number of transmissions received thereby within a window satisfies (e.g., is greater than or equal to) a threshold, and use a Tx SL measurement otherwise.

As an example, the sidelink relay and/or the WTRU may use a sidelink measurement of data transmission (e.g., a Tx SL measurement of a data transmission, an Rx SL measurement of a data transmission or a combination of Tx SL measurement and an Rx SL measurement of a data transmission) if transmissions/receptions are periodic, and may use a sidelink discovery transmission measurement (e.g., SD-RSRP measurement) otherwise.

As an example, the sidelink relay and/or the WTRU may use a sidelink measurement of data transmission (e.g., a Tx SL measurement of a data transmission, an Rx SL measurement of a data transmission or a combination of Tx SL measurement and an Rx SL measurement of a data transmission) or a sidelink discovery transmission measurement (e.g., SD-RSRP measurement) depending on which of the two types of transmissions occur more frequently.

In various embodiments, relay (re)selection may depend on which of one or more sidelink measurements is available and/or measured. In various embodiments, a WTRU and/or a sidelink relay may trigger relay (re)selection using different rules, and/or depending on which of one or more sidelink measurements is available and/or measured, and/or on which of the one or more sidelink measurements is used. For example, a WTRU and/or a sidelink relay may trigger reselection when a sidelink measurement (as determined herein) satisfies (e.g., is below) a threshold. The WTRU and/or a sidelink relay may be configured with different thresholds for each type of sidelink measurement.

A WTRU and/or a sidelink relay may be configured with a rule to trigger (re)selection based on a sidelink measurement of a data transmission (e.g., a Tx SL measurement of a data transmission, an Rx SL measurement of a data transmission or a combination of Tx SL measurement and an Rx SL measurement of a data transmission) and a sidelink discovery transmission measurement (e.g., SD-RSRP measurement). For example, the WTRU and/or a sidelink relay may be trigger (re)selection when the sidelink measurement of a data transmission satisfies (e.g., is below) a threshold and the sidelink discovery transmission measurement (e.g., of a potential/candidate sidelink relay) is above a threshold. The WTRU and/or a sidelink relay may be (pre)configured with the specific measurement (e.g., the sidelink measurement of a data transmission and/or the sidelink discovery transmission measurement) to use to trigger a (re)selection decision.

In various embodiments, a WTRU and/or a sidelink relay may consider measurements of other sidelink relays and/or a base station (e.g., a gNB) as part of, or in connection with, a (re)selection decision. How such measurements may be considered may depend on which of one or more sidelink measurements is available and/or measured. For example, if sidelink measurement of data transmissions (e.g., any of a Tx SL measurement of a data transmission, an Rx SL measurement of a data transmission, and a combination of Tx SL measurement and an Rx SL measurement of a data transmission) of a current sidelink relay are available/considered (as described herein), the WTRU and/or a sidelink relay may trigger reselection on condition that the sidelink measurement of data transmissions of the current sidelink relay fails to satisfy (e.g., is below) a threshold, and a sidelink discovery transmission measurement (e.g., SD-RSRP measurement) of an alternate/potential/candidate sidelink relay satisfies (is above) another threshold. As another example, if sidelink discovery transmission measurements (e.g., SD-RSRP measurements) of the current sidelink relay are available and/or considered (as described herein), the WTRU and/or a sidelink relay may trigger (re)selection when the sidelink discovery transmission measurements (e.g., SD-RSRP measurements) of an alternate/potential/candidate sidelink relay may be a threshold amount above the sidelink discovery transmission measurements (e.g., SD-RSRP measurements) of the current sidelink relay.

A reselection decision may take into account transmit power of sidelink data transmissions, for example, when the transmit powers of the sidelink data transmissions may vary.

In various embodiments, a WTRU may transmit a power level indication when PC5-RRC connected with a peer WTRU. The WTRU may transmit such the power level indication when it operates as a sidelink relay for that PC5-RRC connection. The WTRU may transmit the power level indication, for example, if a reselection decision is based on sidelink measurements of data transmissions (e.g., solely based on sidelink measurements of data transmissions). The WTRU may transmit a transmission including information indicating the power level indication (or an indication of a change in the power level) using one or more of various protocols, including PC5-RRC protocols, MAC-CE protocols, or SCI protocols. For example, the WTRU operating as a sidelink relay may transmit a transmission including information indicating an index corresponding to a range of power levels indicated by a MAC CE. The WTRU operating as a sidelink relay may transmit that transmission, for example, when the range of power levels indicated by the MAC CE changes from one range of power levels to another range of power levels. The WTRU receiving such indication may use the indication to update and/or bias the reselection decision. In various embodiments, a reselection threshold for the reselection decision may be a function of the indication. In various embodiments, the WTRU may be configured with a different threshold to use for each power level indication value and/or power level range.

In various embodiments, a WTRU (e.g., remote WTRU) may determine a reselection decision based on a combination of sidelink measurements (e.g., a Tx SL measurement, an Rx SL measurement or a combination of Tx SL measurement and an Rx SL measurement) from the peer WTRU (e.g., sidelink relay) and transmission power of sidelink transmissions by the WTRU. In various embodiments, the WTRU may use different reselection thresholds according to transmission powers used for transmissions to the same sidelink relay. In various embodiments, the WTRU may determine, bias and/or update one or more (e.g., configured) reselection thresholds based on the transmission power(s) used for transmissions to the same sidelink relay. The WTRU may use a value that is a function of the transmission power(s) to determine, bias and/or update any of the reselection thresholds.

In various embodiments, a WTRU may determine to enable and/or disable reporting/forwarding of sidelink measurements ("SL-measurement reporting"). The WTRU may enable and/or disable the SL-measurement reporting in accordance with the determination. The WTRU may determine to, and/or may, enable and/or disable SL-measurement reporting, for example, for various links. The various links may include one or more unicast links. The WTRU may determine to, and/or may, enable and/or disable SL-measurement reporting based on a presence of discovery.

Examples of the SL-measurement reporting may include aperiodic SL-measurement reporting and periodic SL-measurement reporting. In various embodiments, a periodicity of the SL-measurement reporting may be determined based on a QoS of a relay service.

A decision of whether to enable, disable and/or carry out SL-measurement reporting (and/or which type of SL-measurement reporting to carry out) may be based on any of the following:

(Pre-)configuration.
- As an example, the WTRU may be (pre-)configured per resource pool and/or per unicast link as to whether to enable and/or disable SL-measurement reporting. The WTRU may transmit, to a peer WTRU, one or more transmissions including the information indicating such configuration. The WTRU may transmit the transmissions using one or more of various protocols, including RRC protocols, such as PC5 RRC protocols.

The availability and/or the reception of a message (e.g., DIRECT_COMM_REQ message) from a peer WTRU.
- In various embodiments, the WTRU may enable SL-measurement reporting (and/or a configuration thereof) if the WTRU has not received a discovery message for a time period (e.g., one (pre-)configured time window). In various embodiments, the time period may be (pre-)configured per service and/or per resource pool. In various embodiments, the time period may be a function of a CBR of the resource pool.
- In various embodiments, the WTRU may enable SL-measurement reporting if discovery (e.g., transmission and/or reception of discovery transmissions therefrom) is inhibited, disabled, etc. In various embodiments, the WTRU may disable SL-measurement reporting if discovery (e.g., transmission and/or reception of discovery transmissions therefrom) is not inhibited, enabled, etc.

The discovery model (e.g., Model A or Model B discovery).
- For example, the sidelink relay may enable SL-measurement reporting if Model A discovery is used. Alternatively, the sidelink relay may disable SL-measurement reporting if Model B discovery is used. A remote WTRU may enable SL-measurement reporting if Model B discovery is used, and it may disable SL-measurement reporting if Model A discovery is used.

Representative Load Determination and Load Reporting/Indication

A WTRU (e.g., a sidelink relay) may determine its load based on any of the following:

Buffer information of the WTRU.
- In various embodiments, the WTRU may determine its load based on an amount of data in (or occupancy of) one or more buffers of the WTRU.
- In various embodiments, the WTRU may determine its load based on an amount of data associated with one or more SLRBs and/or one or more LCHs (and/or one or more logical channel groups (LCGs)). As an example, the WTRU may determine its load based on an amount of data associated with the SLRB having (e.g., assigned) the highest priority. As another example, the WTRU may determine its load based on the amount of data associated with a particular or any SLRB, such as, for example, the largest amount of data associated with a particular or any SLRB. As another example, the WTRU may determine its load based on a total amount of data associated with all of the SLRBs. As another example, the WTRU may determine its load based on an amount of data associated with the LCH (and/or LCG) having (e.g., assigned) the highest priority. As another example, the WTRU may determine its load based on the amount of data associated with a particular or any LCH (and/or LCG), such as, for example, the largest amount of data the largest amount of data associated with a particular or any LCH (and/or LCG). As another example, the WTRU may determine its load based on a total amount of data associated with all of the LCHs (and/or LCGs).
- In various embodiments, the WTRU may determine the load (e.g., as disclosed herein) considering (e.g., only considering) the SLRBs and/or the LCHs configured to be used, and/or used, in connection with relaying.
- In various embodiments, the WTRU may determine (e.g., measure) the amount of data in (or occupancy of) the buffers. The buffers may include any of a buffer (e.g., an Radio Link Control (RLC) protocol buffer) associated with a Uu and a buffer associated with an SL RLC protocol channel configured to be used, and/or used, in connection with relaying.
- In the above and herein, the term "SLRB" may refer to any of a sidelink radio bearer and an SL RLC protocol channel associated with an end-to-end bearer (sidelink of Uu).

A number of the current active links of the WTRU and/or a number of connected WTRUs, etc., which may include one or more WTRUs associated with relaying (e.g., only relaying).

A CR of the WTRU.
- In various embodiments, the WTRU may determine its load as, or as a function of, the measured CR on sidelink.
- In various embodiments, the WTRU may compute a CR by considering resources used for relaying data, such as, for example, only resources used for relaying (e.g., transmitting) data. In various embodiments, the WTRU may compute a relay specific CR and determine that such CR is its load. The WTRU may compute the relay specific CR based on, and/or using, resources reserved by the WTRU for relaying data.

A WTRU (e.g., a source WTRU, a destination WTRU, etc.) may be (pre-)configured with a mapping table to use for determining load information of a sidelink relay (or another WTRU). The sidelink relay (or other WTRU) may indicate its load information by transmitting one or more transmission (e.g., one or more discovery message transmissions) including information indicating the load information. The information indicating the load information may be, for example, information indicating (e.g., an index of) corresponding buffer information. The WTRU may transmit the transmission, for example, using one or more of various protocols, and the information indicating the load information may be carried in any of a MAC CE and an SL RRC message, for example. In various embodiments, the sidelink relay (or other WTRU) may transmit load information implicitly. For example, the sidelink relay (or other WTRU) may transmit the load information using one or more transmissions (e.g., one or more discovery message transmissions) that include information that implicitly indicates the load information. The information that implicitly indicates the load information may include any of: (i) a resource or set of resources (time/frequency) allocated to a load value (e.g., a specific resource or set of resources (time/frequency) allocated to a different load value); (ii) a periodicity of the transmissions (e.g., discovery message transmissions) associated to a load value (e.g., a different load value); (iii) a transmission power of the transmissions (e.g., discovery message transmissions) associated with a load value (e.g., a different load value); (iv) use of different discovery model (e.g., model A vs model B); and (v) a LCH or LCH ID (e.g., a different LCH or LCH ID) for transmission of the transmissions (e.g., discovery message transmissions), such as, for example, where an LCH ID may be associated with a load (range) and/or different LCH IDs may be associated with different loads (ranges).

A sidelink relay (or other WTRU) may determine different load quantities based on (e.g., depending on, as a function of, etc.) any of the following:

UL and/or DL
    In various embodiments, the sidelink relay (or other WTRU) may compute or otherwise determine any of an UL load and a DL load. The sidelink relay (or other WTRU) may determine the UL load (e.g., using methods herein) from traffic and/or one or more links associated with relaying from the sidelink to Uu. The sidelink relay (or other WTRU) may determine the DL load from traffic and/or one or more links associated with relaying from the Uu to the sidelink.

Priority and/or QoS
    In various embodiments, the sidelink relay (or other WTRU) may compute or otherwise determine a plurality of load quantities. Each of the load quantities may be associated with a priority or similar QoS property associated with the data being relayed. In various embodiments, the sidelink relay (or other WTRU) may compute or otherwise determine the load associated with a subset of RLC channels having similar QoS characteristics (e.g., priority), and/or a number of links having similar priorities and/or services.

In various embodiments, a remote WTRU may consider the different load quantities in connection with relay (re)selection. The remote WTRU may consider the different load quantities in combination with its own service characteristics in connection with relay (re)selection. In various embodiments, the remote WTRU may prioritize, and/or prioritize consideration of, an UL load or a DL load based on (e.g., depending on) a configuration of the established end-to-end bearers. In various embodiments, decision-making criteria that the remote WTRU may use for (re)selection may be configured such that the DL load may be more important than the UL load (or vice versa). In various embodiments, the remote WTRU may prioritize, and/or prioritize consideration of, an UL load or a DL load based on (e.g., depending on) information configured at that WTRU from the network or upper layers. In various embodiments, the remote UE may consider a priority specific load that may be similar and/or the same as the priority and/or QoS of the data to be sent/received from the network. In various embodiments, the remote UE may consider only the priority specific load that may be similar and/or the same as the priority and/or QoS of the data to be sent/received from the network.

In various embodiments, a WTRU (e.g., a remote WTRU) may select a sidelink relay (e.g., for relay selection) based on the load of the sidelink relay and/or sidelink measurement of a path that includes the sidelink relay. In various embodiments, the WTRU may be (pre-)configured with a relay load threshold (e.g., a maximum relay load can be selected). The relay load threshold may be (pre-)configured based on a QoS of the relay service and/or a CBR of the resource pool. The WTRU may select one of a plurality, or a set, of sidelink relays based on satisfying (re)selection criteria including the sidelink measurements associated with the sidelink relays (e.g., the sidelink relay having the highest SL-RSRP measurement) and/or the load information of the sidelink relays (e.g., conditions on load, such as permissible load). In various embodiments, the WTRU may be (pre-)configured with a minimum sidelink measurement (e.g., a minimum RSRP between itself to a relay) to select the relay. In various embodiments, the minimum sidelink measurement (e.g., the minimum RSRP) may be (pre-)configured based on the CBR of the resource pool and/or QoS of the relay service. The WTRU may select one of a plurality, or a set, of sidelink relays based on the loads. For example, the WTRU may select one of the plurality of sidelink relays based on which sidelink relay has the lowest load among all of the sidelink relays that satisfy the sidelink measurement criteria. Alternatively, the WTRU may select a set of sidelink relays based on which sidelink relays have the lowest loads among all of the sidelink relays that satisfy the sidelink measurement criteria.

In various embodiments, the WTRU may determine whether to select another of the plurality, or the set, of sidelink relays (e.g., for relay reselection) based on any of a load of the current relay, a load of a potential/candidate relay, sidelink measurements associated with the current relay, and/or sidelink measurements associated with the potential/candidate relay. In various embodiments, the WTRU may be (pre-)configured with, and may use, various criteria in connection with performing relay reselection. The various criteria may include, and/or be based on, any of: (i) a load threshold of the current relay; (ii) a load threshold of a potential relay; (iii) a load offset threshold between the current relay and the potential relay to perform relay reselection; (iv) a sidelink measurement (e.g., an SL-RSRP measurement) threshold of the current relay; (v) a sidelink measurement (e.g., an SL-RSRP measurement) of a potential relay; and (vi) a sidelink measurement (e.g., an SL-RSRP measurement) offset threshold between the current relay and the potential relay.

The WTRU may perform relay selection if a load condition and/or a sidelink measurement condition is satisfied. In various embodiments, the WTRU may select another relay (e.g., for relay reselection) if it detects another sidelink relay having a load offset from the current sidelink relay that satisfies (e.g., is greater than) the offset threshold and/or having a sidelink measurement (e.g., the SL-RSRP measurement) offset from the current sidelink relay that satisfies (e.g., is greater than) the sidelink measurement (e.g., SL-RSRP measurement) offset threshold.

Representative Recovery Procedure

In various embodiments, a WTRU may perform a recovery procedure based on, and/or by carrying out, any of the following:

The WTRU may send inactive indication to the newly established link.

In various embodiments, the WTRU may maintain information on and/or about one or more inactive relays to facilitate fast relay (re)selection (e.g., according to a fast relay (re)selection procedure). The WTRU may then send an inactive indication to the newly established link if it can recover the current relay based on the information on and/or about one or more inactive relays.

The WTRU may stop relay reselection by stop transmitting and/or receiving direct communication messages (e.g., DIRECT_COMM_REQ message) transmission.

The WTRU may release the connection with the newly established link, for example, by sending a PC5 RRC release message.

The WTRU may perform any of various embodiments of the above procedure if it can perform transmission/reception using the current relay (e.g., recovery from the current relay is possible). The WTRU may determine whether it can transmit/receive using the current relay based on any of the following:

The sidelink measurement of the current relay being better than a threshold; and The UE receiving a message (e.g., DIRECT_COMM_REQ message).

In various embodiments, the WTRU may perform path (re)selection based on reception of source data (e.g., reception of one or more transmissions from a source WTRU). The WTRU may switch from a relay path to a direct path if, for example, the WTRU correctly decodes one or more messages from a source WTRU. In various embodiments, the WTRU may monitor a direct communication message (e.g., DIRECT_COMM_REQ message) from the source WTRU and/or may perform path reselection if, for example, a RSRP associated with the direct communication message of the source WTRU is greater than a threshold.

In various embodiments, the WTRU may determine which sidelink measurement (e.g., which of sidelink measurement(s) of direct communication message (e.g., DIRECT_COMM_REQ message) transmission(s) and/or sidelink measurement(s) of data transmission(s)) to use for, or in connection with, determining (e.g., estimating) a sidelink channel between the sidelink relay and the remote WTRU and/or a sidelink channel between two remote WTRUs. The sidelink measurement may be determined based on any of the following:

Configured per service. For example, each relay service may be configured with one or both of the sidelink measurement(s) of direct communication message transmission(s) and the sidelink measurement(s) of data transmission(s) may be configured for each relay service. The WTRU may determine which sidelink measurement to use for, or in connection with, determining the sidelink channel based on the relay service.

CBR of the resource pool. For example, the WTRU may determine to use and/or use the sidelink measurement(s) of direct communication message transmission(s) for, or in connection with, determining a quality of the sidelink channel if, for example, a CBR of the data resource pool is larger than a threshold. Alternatively, the WTRU may determine to use and/or use the sidelink measurement(s) of data communication(s) if, for example, the CBR of the data resource pool is smaller than the threshold. This approach may be motivated to reduce transmissions of the WTRU in the data resource pool when CBR is high.

CR of the WTRU. For example, the WTRU may use sidelink measurement(s) of data communication(s) for, or in connection with, determining the sidelink channel if, for example, the CR of the WTRU satisfies (e.g., is greater or smaller than) a threshold and/or may use the sidelink measurement(s) of direct communication message transmission(s) otherwise.

Discovery model (Model A, model B, or a combination of both model A and model B) used in the relay service. For example, the WTRU may use sidelink measurement(s) of direct communication message transmission(s) for one discovery model (e.g., model A) relay service for, or in connection with, determining the sidelink channel and use sidelink measurement(s) of data communication(s) for a different discovery model (e.g., model B) relay service for, or in connection with, determining the sidelink channel.

The frequency of transmissions during a time period. In various embodiments, the WTRU may use a sidelink measurement of data transmission (e.g., a Tx SL measurement of a data transmission, an Rx SL measurement of a data transmission or a combination of Tx SL measurement and an Rx SL measurement of a data transmission) if an amount of the data transmissions in one direction (Tx or Rx) and/or both directions (Tx and Rx) satisfies (e.g., is greater than) a threshold, and may use a sidelink discovery transmission measurement (e.g., SD-RSRP measurement) otherwise.

In various embodiments, the WTRU may be informed by another WTRU as to which of the sidelink measurements (e.g., which of sidelink measurement(s) of direct communication message (e.g., DIRECT_COMM_REQ message) transmission(s) and/or sidelink measurement(s) of data transmission(s)) to use for a relay service. In various embodiments, the other WTRU may inform the WTRU of which of the sidelink measurements to use for the relay service using one or more direct communication messages (e.g., including an indication thereof in the direct communication message(s)). Alternatively, the other WTRU may inform the WTRU of which of the sidelink measurements to use in a PC5 RRC message (e.g., when the WTRUs have an established PC5 RRC connection. Alternatively, the other WTRU may inform the WTRU of which of the sidelink measurements to use during a link establishment procedure.

A WTRU (e.g., sidelink relay or remote WTRU) may start/stop monitoring a discovery resource pool following reception of an indication of which of the sidelink measurements to use from a peer WTRU. In various embodiments, the WTRU may stop monitoring the discovery resource pool if, for example, it receives an indication (e.g., in PC5 RRC message) to use sidelink measurement(s) of data communication(s) for, or in connection with, determining a sidelink channel. Alternatively, the WTRU may start monitoring the discovery resource pool if, for example, it receives an indication to use sidelink measurement(s) in discovery resource pool for, or in connection with, determining a sidelink channel.

Representative Methods to Support Unicast/Groupcast-Based Relay Communication

In various embodiments, a WTRU may prioritize a sidelink relay over other sidelink relays if, for example, the sidelink relay is in the same group with the remote WTRU (source WTRU and/or destination WTRU). Group information may be implicitly/explicitly included in a direct communication message (e.g., DIRECT_COMM_REQ message). In various embodiments, the WTRU may prioritize a sidelink relay in the same group if, for example, the sidelink measurement of a direct communication message is greater than a threshold. In various embodiments, the WTRU may further prioritize the sidelink relay in the group based on a WTRU ID and/or a sidelink relay ID. For example, the WTRU may prioritize a WTRU that is a group leader of the group as the sidelink relay. Alternatively, the WTRU may prioritize a specific WTRU ID in the group based on its ID.

In various embodiments, a WTRU may (pre)determine one or more WTRUs as candidates for a sidelink relay. The WTRU may indicate WTRU IDs of the candidate WTRUs and/or a group ID in a direct communication message (e.g., DIRECT_COMM_REQ message) to request one or more WTRUs to become the sidelink relay. For example, in a platooning scenario, the WTRU may be indexed according to its order in the platoon. WTRU4 may want to communicate with the leader (e.g., WTRU1) via a sidelink relay. WTRU4 may indicate WTRU2 and WTRU3 as candidates for the sidelink relays in a direct communication message. Alternatively, WTRU4 may indicate a group ID of a group of candidate WTRUs, where any of the candidate WTRUs within the group may become the sidelink relay of WTRU4.

In various embodiments, a sidelink relay may determine whether to forward a message (e.g., a DIRECT_COMM_REQ message) (possibly for groupcast/broadcast-based relay service) based on any of the following:

an RSRP associated with the message. For example, the sidelink relay may forward a message (e.g., a DIRECT_COMM_REQ message) if, for example, a RSRP associated with the message is larger than a threshold and/or smaller than another threshold.
  a distance between the source and the relay WTRU. For example, the sidelink relay may forward a message (e.g., a DIRECT_COMM_REQ message) if, for example, the distance between the sidelink relay and the remote WTRU is greater than a threshold and/or smaller than another threshold.

Figure 6:
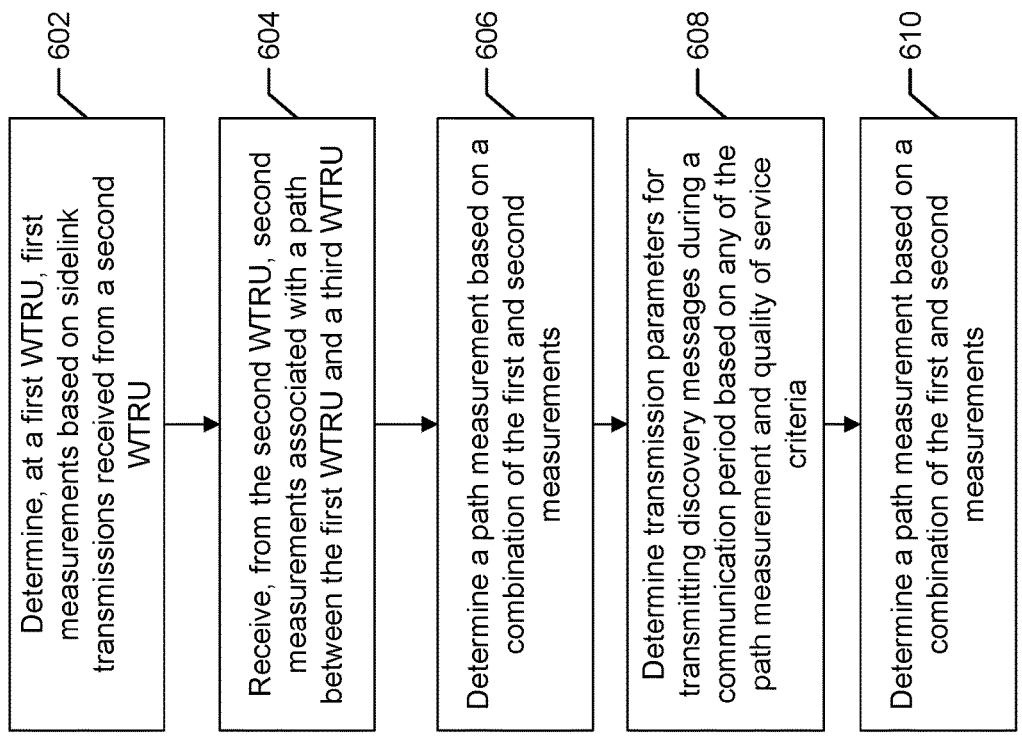
FIG. 6 is a flow chart illustrating an example flow for carrying out path selection or path reselection.

FIG. 6 is a flow chart illustrating an example flow 600 for carrying out path selection or path reselection. The flow 600 and accompanying disclosures herein may be considered a generalization of at least the disclosures accompanying FIGS. 3-5, and are considered to encompass and/or include various embodiments of the disclosures above, including, for example, the disclosures accompanying FIGS. 3-5. The flow 600 may be carried out using the architecture of the communications system 100 of FIGS. 1-2. The flow 600 may be carried out using other architectures as well.

Referring to FIG. 6, a first WTRU (e.g., a source WTRU) may determine one or more first measurements based on one or more first sidelink transmissions received from a second WTRU (e.g., a first sidelink relay) (602). The first WTRU may receive, from the second WTRU, one or more second measurements associated with a path that is between the first WTRU and a third WTRU (e.g., a destination WTRU) and that includes the second WTRU (604). The second measurements may be based, at least in part, on one or more second sidelink transmissions exchanged between the third WTRU and the second WTRU. Alternatively, the second measurements may be based, at least in part, on one or more second sidelink transmissions exchanged between the third WTRU and a fourth WTRU (e.g., a second sidelink relay).

The first WTRU may determine a measurement ("path measurement") of the path based on a at least one the first measurements and at least one of the second measurements (606). The first WTRU may determine one or more transmission parameters for transmitting one or more discovery messages during a communication period based on any of the path measurement and QoS criteria (608). The WTRU may transmit the discovery messages according to the transmission parameters. (610).

Although not shown, the first WTRU may make a determination to transmit the discovery messages based on any of the QoS criteria and the path measurement, e.g., prior to determining the transmission parameters. In various embodiments, the first WTRU may make a determination to not transmit discovery messages based on any of the QoS criteria and the path measurement, e.g., prior to determining the transmission parameters, and may forego determining the transmission parameters and transmitting the discovery messages according to the transmission parameters. In various embodiments, the WTRU may trigger transmission of the discovery messages based on the QoS and the path measurement and may transmit the discovery messages if still triggered.

In various embodiments, the transmission parameters may include any of a transmit power, a number of (re)transmissions, and a periodicity for transmission of the discovery messages. In various embodiments, the WTRU may determine the path measurement as a function (metric) of (i) the first measurements, or (ii) the second measurements, or (iii) at least one of the first measurements and at least one of the second measurements. In various embodiments, the function may be any of a minimum RSRP and a maximum RSRP.

In various embodiments, the path measurement may include one or more metrics of (i) the first measurements, or (ii) the second measurements, or (iii) at least one of the first measurements and at least one of the second measurements. In various embodiments, the metrics nay include any of a minimum RSRP and a maximum RSRP.

In various embodiments, the second measurements may include any of a channel quality indicator (CQI), a reference signal receive power (RSRP), a reference signal receive quality (RSRQ), a pathgain, a pathloss, a distance between the first and second WTRUs, a distance between the second and third WTRUs, a reachability indicator, a channel busy ratio (CBR) of a resource pool, and a channel occupancy ratio (CR) of the second WTRU. In various embodiments, the first measurements may include any of a channel quality indicator (CQI), a reference signal receive power (RSRP), a reference signal receive quality (RSRQ), a pathgain, a pathloss, a distance between the first and second WTRUs, a channel busy ratio (CBR) of a resource pool, and a channel occupancy ratio (CR) of the first sidelink relay.

In various embodiments, the second measurements may be based (further based), at least in part, on one or more third sidelink transmissions transmitted by the first WTRU. In various embodiments, the second measurements may be based (further based), at least in part, on one or more fourth sidelink transmissions exchanged between the second WTRU and the fourth WTRU. In various embodiments, the second measurements may be based (further based), at least in part on, one or more fourth sidelink transmissions exchanged between a fifth WTRU and the fourth WTRU and one or more fifth sidelink transmissions exchanged between the second WTRU and the fifth WTRU.

In various embodiments, the path that is between the first WTRU and a third WTRU and that includes the second WTRU may be a first path. And although not shown, the first WTRU may receive from a sixth WTRU, a sixth sidelink transmission including a discovery message, wherein the discovery message may include one or more third measurements associated with a second path that is between the first WTRU and a third WTRU and that includes the sixth WTRU. The third measurements may be based, at least in part, on one or more seventh sidelink transmissions exchanged between the third WTRU and the sixth WTRU. The first WTRU determine one or more fourth measurements based on the sixth sidelink transmission. The first WTRU may determining a path measurement of the second path based on a at least one of the third measurements and at least one of the fourth measurements. The first WTRU may perform selection of the sixth WTRU based at least in part on the path measurement of the second path.

In various embodiments, the first WTRU may perform selection of the sixth WTRU based at least in part on the path measurement of the second path and one or more criteria. In various embodiments, the one or more criteria include any (i) a received signal strength of the message; (ii) a distance between the first and second WTRUs; (iii) a distance between the first WTRU and a third WTRU; (iv) a QoS criteria; (v) a location of the first WTRU, (vi) a location of the second WTRU; (vii) a location of the third WTRU; (viii) a CBR of a resource pool; (ix) a CR of the first WTRU; (x) speed of the second WTRU; (xi) a speed of the third WTRU, (xii) a number of relayed links, (xiii) a number of SLRBs currently established at the second WTRU; and (xiv) a previous reception of other related messages associated with a reselection event.

In various embodiments, the first WTRU may receive information indicating one or more metrics of one or more of the second measurements associated with first path. The first WTRU may determine the path measurement of the first path based on the first measurements and the second measurements and/or the one or more metrics of one or more of the second measurements. In various embodiments, the metrics may include any of a minimum RSRP and a maximum RSRP.

Figure 7:
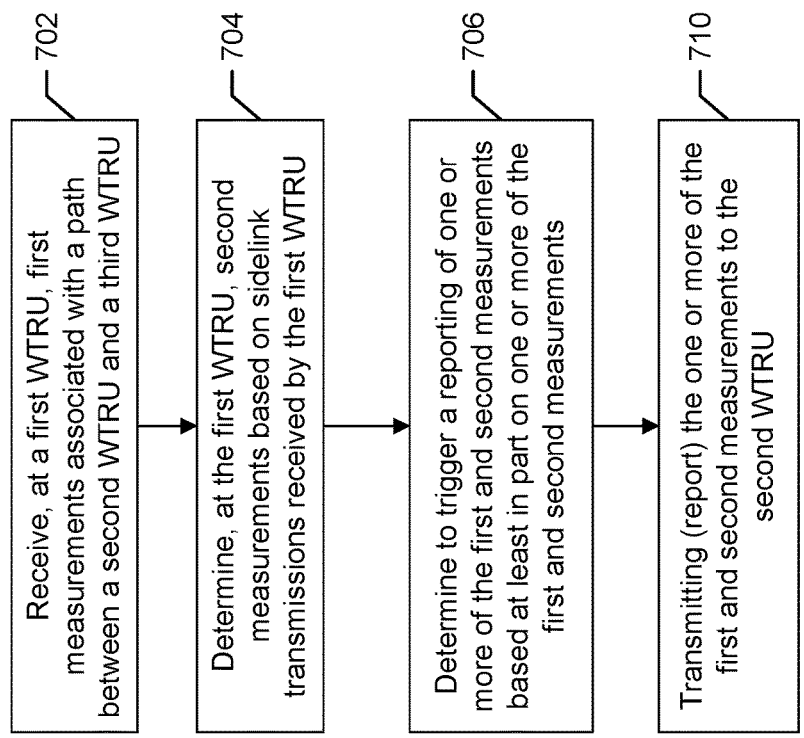
FIG. 7 is a flow chart illustrating an example flow for carrying out measurement reporting.

FIG. 7 is a flow chart illustrating an example flow 700 for carrying out measurement reporting. The flow 700 and accompanying disclosures herein may be considered a generalization of at least the disclosures accompanying FIGS. 3-5, and are considered to encompass and/or include various embodiments of the disclosures above, including, for example, the disclosures accompanying FIGS. 3-5. The flow 700 may be carried out using the architecture of the communications system 100 of FIGS. 1-2. The flow 700 may be carried out using other architectures as well.

Referring to FIG. 7, a first WTRU (e.g., a sidelink relay) may receive one or more first measurements associated with a path that is between a second WTRU (e.g., a source (destination) WTRU) and a third WTRU (e.g., a destination (source) WTRU) and that includes the first WTRU (702). The first measurements may be based, at least in part, on at least one of (i) one or more first sidelink transmissions received from the second WTRU, (ii) one or more second sidelink transmissions transmitted from the first WTRU to the third WTRU or to a fourth WTRU (e.g., another sidelink relay), and (iii) one or more third sidelink transmissions exchanged between the third WTRU and the fourth WTRU or between the third WTRU and a fifth WTRU (another sidelink relay).

The first WTRU may determine one or more second measurements based on one or more fourth sidelink transmissions received from the third WTRU or the fourth WTRU (704). The first WTRU may determine to trigger a reporting of one or more of the first measurements and the second measurements based on (i) a QoS (e.g., of a relay service), (ii) a channel busy ratio (CBR) of a resource pool (e.g., configured for sidelink transmissions), and (iii) one or more metrics of the one or more first measurements, or the one or more second measurements, or at least one of the one or more first measurements and at least one of the one or more second measurements (706). The first WTRU may transmit the one or more of the first measurements and the second measurements to the second WTRU (708). The first WTRU, for example, may transmit one or more sidelink transmissions that include the one or more of the first measurements and the second measurements.

In various embodiments, the first WTRU may receiving information indicating that a direct communication message from the second WTRU is forthcoming. In various embodiments, the information may be, or may be received in, sidelink control information (SCI) associated with the direct communication message. In various embodiments, the direct communication message may include a relay request.

Figures 8, 9:
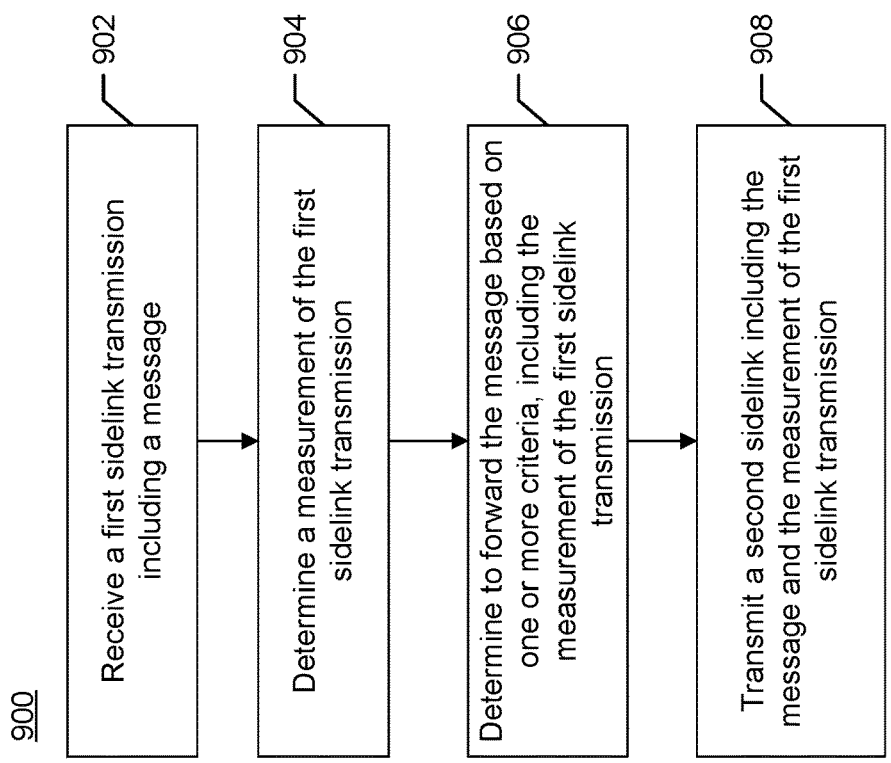
FIG. 8 is a flow chart illustrating an example flow for carrying out relay selection or reselection.
FIG. 9 is a flow chart illustrating an example flow for carrying out message forwarding.

FIG. 8 is a flow chart illustrating an example flow 800 for carrying out relay selection or reselection. The flow 800 and accompanying disclosures herein may be considered a generalization of at least the disclosures accompanying FIGS. 3-5, and are considered to encompass and/or include various embodiments of the disclosures above, including, for example, the disclosures accompanying FIGS. 3-5. The flow 800 may be carried out using the architecture of the communications system 100 of FIGS. 1-2. The flow 800 may be carried out using other architectures as well.

Referring to FIG. 8, a first WTRU (e.g., a source (destination) WTRU) may obtain one or more measurements for each of one or more other WTRUs (e.g., sidelink relays) (802). The one or more measurements for each of the other WTRUs may be based at least in part on one or more sidelink transmissions exchanged between the first WTRU and the corresponding other WTRU. The first WTRU may perform reselection among the one or more other WTRUs based at least in part on the one or more measurements of the one or more other WTRUs (804).

In various embodiments, the first WTRU may perform reselection among the other WTRUs based at least part on the measurements and a QoS criteria (e.g., of a service). In various embodiments, the first WTRU may perform reselection among the one or more other WTRUs based at least part on the one or more measurements and a number of hops per path for one or more of a plurality of paths associated with the one or more other WTRUs. In various embodiments, the first WTRU may perform reselection among the other WTRUs based at least part the one or more measurements and any of a QoS criteria (e.g., of a service) and a number of hops per path for one or more of a plurality of paths associated with the one or more other WTRUs. In various embodiments, the first WTRU may perform reselection among the other WTRUs based at least part on the one or more measurements and load information of any of the other WTRUs and the first WTRU. In various embodiments, the first WTRU may perform reselection among the other WTRUs based at least part on the one or more measurements and load information of any of the other WTRUs, the first WTRU and a network element.

In various embodiments, the first WTRU may determine at least some of the one or more measurements. In various embodiments, the first WTRU may determine a measurement of each of a plurality of paths associated with the one or more other WTRUs. In various embodiments, the first WTRU may determine the measurement of each of the plurality of paths based on one or more measurements of one or more sidelink transmission occurring on some or all hops of such path.

In various embodiments, the measurement of at least one path of the plurality of paths may be any of a SL-RSRP measurement of a hop of the at least one path of the plurality of paths and an accumulated SL-RSRP of a hop of the at least one path of the plurality of paths. In various embodiments, the measurement of at least one path of the plurality of paths is a combination of SL-RSRP measurements of a plurality of hops of the at least one path of the plurality of paths. In various embodiments, the measurement of at least one hop of at least one path of the plurality of paths may include any of a measurement of a sidelink transmission received by the WTRU, an accumulation or other combination of measurements of sidelink transmissions received by the WTRU, a one or more reported measurement of a transmission, and a reported accumulation or other combination of measurements of sidelink transmissions.

In various embodiments, the first WTRU may determine a measurement for at least one hop of at least one path of the plurality of paths. In various embodiments, the first WTRU may determine a measurement for one or more sidelink transmission occurring on at least one hop of at least one path of the plurality of paths. In various embodiments, the first WTRU may determine the measurement using and/or as a function of, any of a measurement of a sidelink transmission received by the WTRU, an accumulation or other combination measurements of sidelink transmissions received by the WTRU, a reported measurement of a sidelink transmission, and a reported accumulation or other combination of measurements of sidelink transmissions. In various embodiments, the first WTRU may determine the measurement using and/or as a function of, any of a measurement of a sidelink data transmission and a measurement a direct communication message transmission. In various embodiments, the first WTRU may determine the measurement using and/or as a function of, any of a measurement of a sidelink data transmission and a measurement a sidelink discovery message transmission.

FIG. 9 is a flow chart illustrating an example flow 900 for carrying out message forwarding. The flow 900 and accompanying disclosures herein may be considered a generalization of at least the disclosures accompanying FIGS. 3-5, and are considered to encompass and/or include various embodiments of the disclosures above, including, for example, the disclosures accompanying FIGS. 3-5. The flow 900 may be carried out using the architecture of the communications system 100 of FIGS. 1-2. The flow 900 may be carried out using other architectures as well.

Referring to FIG. 8, a first WTRU (e.g., a sidelink relay) may receive, from a second WTRU (e.g., a source WTRU, destination WTRU or another sidelink relay), a first sidelink transmission including a message (902). The first WTRU may determine a measurement of the first sidelink transmission (904). The first WTRU may determine to forward the message based on one or more criteria, including the measurement of the first sidelink transmission (906). The first WTRU may transmit a second sidelink including the message and the measurement of the first sidelink transmission (908). In various embodiments the message may be a direct communication message. In various embodiments, the criteria may include any (i) a received signal strength of the message; (ii) a distance between the first and second WTRUs; (iii) a distance between the first WTRU and a third WTRU; (iv) a QoS criteria; (v) a location of the first WTRU, (vi) a location of the second WTRU; (vii) a location of the third WTRU; (viii) a CBR of a resource pool; (ix) a CR of the first WTRU; (x) speed of the second WTRU; (xi) a speed of the third WTRU, (xii) a number of relayed links, (xiii) a number of SLRBs currently established at the second WTRU; and (xiv) a previous reception of other related messages associated with a reselection event.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶6 or means-plus-function claim format, and any claim without the terms "means for" is not so intended.

What is claimed is:

1. A method implemented in a first wireless transmit/receive unit (WTRU), the method comprising:
   receiving one or more data transmissions from a second WTRU;
   determining to use, for triggering relay reselection, one of
   (i) sidelink reference signal received power measurements associated with the one or more data transmissions or (ii) sidelink reference signal received power measurements associated with one or more discovery transmissions received from the second WTRU, wherein the determining is based on:
   a precedence of at least one of (i) the sidelink reference signal received power measurements associated with the one or more data transmissions and (ii) the sidelink reference signal received power measurements associated with the one or more discovery transmissions; and
   availability of the sidelink reference signal received power measurements associated with the one or more data transmissions; and
performing the relay reselection based on the determined one of (i) the sidelink reference signal received power measurements associated with the one or more data transmissions or (ii) the sidelink reference signal received power measurements associated with the one or more discovery transmissions failing to satisfy one or more thresholds.

2. The method of claim 1, comprising:
receiving information configuring a first resource pool, wherein the first resource pool indicates the precedence of the sidelink reference signal received power measurements associated with the one or more data transmissions.

3. The method of claim 1, comprising:
triggering the relay reselection based on the determined sidelink reference signal received power measurements failing to satisfy one or more thresholds, wherein performing the relay reselection based on the determined sidelink reference signal received power measurements failing to satisfy one or more thresholds comprises performing relay reselection based on the triggering of relay reselection.

4. The method of claim 1, comprising:
receiving information configuring a second resource pool, wherein the second resource pool indicates a precedence of the sidelink reference signal received power measurements associated with the discovery transmissions over the sidelink reference signal received power measurements associated with the data transmissions.

5. The method of claim 1, wherein the determined sidelink reference signal received power measurements are the one or more sidelink reference signal received power measurements associated with the one or more data transmissions based on (i) the precedence of the sidelink reference signal received power measurements associated with the data transmissions, (ii) the one or more sidelink reference signal received power measurements associated with the data transmissions being available, and (iii) the first WTRU is currently receiving data transmissions from the second WTRU.

6. The method of claim 1, wherein the determined sidelink reference signal received power measurements are the one or more sidelink reference signal received power measurements associated with the one or more data transmissions based on (i) the precedence of the sidelink reference signal received power measurements associated with the discovery transmissions, (ii) the one or more sidelink reference signal received power measurements associated with the data transmissions being available, and (iii) the first WTRU is currently receiving data transmissions from the second WTRU.

7. The method of claim 1, wherein the determined sidelink reference signal received power measurements are the one or more sidelink reference signal received power measurements associated with the one or more discovery transmissions based on one or more of (i) the precedence of the sidelink reference signal received power measurements associated with the data transmissions, (ii) the one or more sidelink reference signal received power measurements associated with the data transmissions not being available and (iii) the first WTRU not currently receiving data transmissions from the second WTRU.

8. The method of claim 1, wherein the determined sidelink reference signal received power measurements are the one or more sidelink reference signal received power measurements associated with the one or more discovery transmissions based on one or more of (i) a precedence of the sidelink reference signal received power measurements associated with the discovery transmissions, (ii) the one or more sidelink reference signal received power measurements associated with the data transmissions not being available and (iii) the first WTRU not currently receiving data transmissions from the second WTRU.

9. A first wireless transmit/receive unit (WTRU) comprising circuitry, including a transmitter, a receiver, a processor and memory, configured to:
receive one or more data transmissions from a second WTRU;
determine to use, for triggering relay reselection, one of (i) sidelink reference signal received power measurements associated with the one or more data transmissions or (ii) sidelink reference signal received power measurements associated with one or more discovery transmissions received from the second WTRU, wherein the determination is based on:
   a precedence of at least one of (i) the sidelink reference signal received power measurements associated with the one or more data transmissions and (ii) the sidelink reference signal received power measurements associated with the one or more discovery transmissions; and
   availability of the sidelink reference signal received power measurements associated with the one or more data transmissions; and
perform the relay reselection based on the determined one of (i) the sidelink reference signal received power measurements associated with the one or more data transmissions or (ii) the sidelink reference signal received power measurements associated with the one or more discovery transmissions failing to satisfy one or more thresholds.

10. The first WTRU of claim 9, wherein the circuitry is configured to:
receive information configuring a first resource pool, wherein the first resource pool indicates the precedence of the sidelink reference signal received power measurements associated with the one or more data transmissions.

11. The first WTRU of claim 9, wherein the circuitry is configured to:
trigger the relay reselection based on the determined sidelink reference signal received power measurements failing to satisfy one or more thresholds, wherein the circuitry being configured to perform the relay reselection based on the determined sidelink reference signal received power measurements failing to satisfy one or more thresholds comprises the circuitry being configured to perform the relay reselection based on the relay reselection being triggered.

12. The first WTRU of claim 9, wherein the determined sidelink reference signal received power measurements are the one or more sidelink reference signal received power measurements associated with the one or more data transmissions based on (i) the precedence of the sidelink reference signal received power measurements associated with the data transmissions, (ii) the sidelink reference signal received power measurements associated with the data transmissions being available, and (iii) the first WTRU is currently receiving data transmissions from the second WTRU.

13. The first WTRU of claim 9, wherein the circuitry is configured to:
   receive information configuring a second resource pool, wherein the second resource pool indicates a precedence of the sidelink reference signal received power measurements associated with the discovery transmissions over the sidelink reference signal received power measurements associated with the data transmissions.

14. The first WTRU of claim 9, wherein the determined sidelink reference signal received power measurements are the one or more determined sidelink reference signal received power measurements associated with the one or more data transmissions based on (i) the precedence of the sidelink reference signal received power measurements associated with the discovery transmissions, (ii) the one or more sidelink reference signal received power measurements associated with the data transmissions being available, and (iii) the first WTRU is currently receiving data transmissions from the second WTRU.

15. The first WTRU of claim 9, wherein the determined sidelink reference signal received power measurements are the sidelink reference signal received power measurements associated with the one or more discovery transmissions based on one or more of (i) the precedence of the sidelink reference signal received power measurements associated with data transmissions, (ii) the sidelink reference signal received power measurements associated with the data transmissions not being available and (iii) the first WTRU not currently receiving data transmissions from the second WTRU.

16. The first WTRU of claim 9, wherein the determined sidelink reference signal received power measurements are the sidelink reference signal received power measurements associated with the one or more discovery transmissions based on one or more of (i) a precedence of sidelink reference signal received power measurements associated with discovery transmissions, (ii) the one or more sidelink reference signal received power measurements associated with the data transmissions not being available and (iii) the first WTRU not currently receiving data transmissions from the second WTRU.

* * * * *